United States Patent
Gundel et al.

(10) Patent No.: US 11,705,700 B2
(45) Date of Patent: Jul. 18, 2023

(54) ELECTRICAL POWER CABLE PREPARATION SYSTEM

(71) Applicants: 3M Innovative Properties Company, St. Paul, MN (US); Connected Intelligence Systems, Ltd., Netanya (IL)

(72) Inventors: Douglas B. Gundel, Cedar Park, TX (US); Assaf Kaufman, Tal Shahar (IL); Uri Bar-Ziv, Zichron Yaakov (IL)

(73) Assignees: 3M Innovative Properties Company, St. Paul, MN (US); Connected Intelligence Systems Ltd., Netanya (IL)

( * ) Notice: Subject to any disclaimer, the term of this patent is extended or adjusted under 35 U.S.C. 154(b) by 92 days.

(21) Appl. No.: 17/309,773

(22) PCT Filed: Dec. 20, 2019

(86) PCT No.: PCT/US2019/067970
§ 371 (c)(1),
(2) Date: Jun. 17, 2021

(87) PCT Pub. No.: WO2020/132517
PCT Pub. Date: Jun. 25, 2020

(65) Prior Publication Data
US 2022/0085583 A1    Mar. 17, 2022

Related U.S. Application Data

(60) Provisional application No. 62/846,351, filed on May 10, 2019, provisional application No. 62/784,214, filed on Dec. 21, 2018.

(51) Int. Cl.
*H02G 1/12*    (2006.01)
*H04N 7/18*    (2006.01)
*H04N 23/51*   (2023.01)

(52) U.S. Cl.
CPC ........... *H02G 1/1265* (2013.01); *H02G 1/127* (2013.01); *H02G 1/1248* (2013.01); *H04N 7/188* (2013.01); *H04N 23/51* (2023.01)

(58) Field of Classification Search
CPC .... H02G 1/1265; H02G 1/1248; H02G 1/127; H04N 7/188; H04N 5/2252
See application file for complete search history.

(56) References Cited

U.S. PATENT DOCUMENTS

| | | |
|---|---|---|
| 3,128,658 A | 4/1964 | Mitchell et al. |
| 4,345,362 A | 8/1982 | de Givry |

(Continued)

FOREIGN PATENT DOCUMENTS

| | | |
|---|---|---|
| CN | 1530965 A | 9/2004 |
| CN | 102623871 A | 8/2012 |

(Continued)

OTHER PUBLICATIONS

U.S. Appl. No. 17/309,774, filed Jun. 17, 2021, naming inventors Gundel et al.

(Continued)

*Primary Examiner* — Jared Walker
(74) *Attorney, Agent, or Firm* — Shumaker & Sieffert, P.A.

(57) ABSTRACT

Electrical power cable preparation techniques to connect to cable accessories for use in a power grid are described. In an example, a system comprises a cross-section sensing module. The cross-section sensing module comprises a camera configured to capture at least one image of an end-face of an electrical cable, a housing configured to position the end-face of the electrical cable substantially perpendicular to an optical axis of the camera and at an imaging distance from the camera, and at least one optical marker configured to indicate a diameter of the electrical cable. The system (Continued)

further comprises an electrical cable preparation device configured to cut at least one layer of an electrical cable, and a computing device configured to display a user interface, the user interface configured to accept user inputs controlling at least one setting of the cross-section sensing module and electrical cable preparation device.

20 Claims, 6 Drawing Sheets

(56) References Cited

U.S. PATENT DOCUMENTS

| | | | |
|---|---|---|---|
| 4,745,828 A | | 5/1988 | Stepan |
| 4,802,512 A | | 2/1989 | Kodera |
| 5,038,457 A | | 8/1991 | Yasushi et al. |
| 5,243,882 A | | 9/1993 | Stepan |
| 5,272,941 A | | 12/1993 | English et al. |
| 6,286,393 B1 | | 9/2001 | Messer et al. |
| 2005/0050713 A1 | | 3/2005 | Locher et al. |
| 2012/0192414 A1 | | 8/2012 | Montena et al. |
| 2015/0062328 A1 | * | 3/2015 | Lauffer ................. G06T 7/0004 348/125 |
| 2015/0089815 A1 | | 4/2015 | Woodward |
| 2015/0128399 A1 | | 5/2015 | Meierhans et al. |
| 2015/0287180 A1 | * | 10/2015 | Frey ....................... G06V 10/42 382/141 |
| 2017/0310092 A1 | | 10/2017 | Viviroli |
| 2017/0346265 A1 | | 11/2017 | Soerensen |
| 2018/0059162 A1 | * | 3/2018 | Leblanc ................. G02B 6/255 |
| 2018/0328531 A1 | * | 11/2018 | Weisenberg ............ F16L 55/18 |
| 2019/0393685 A1 | * | 12/2019 | Sedlacek ............. H02G 1/1265 |

FOREIGN PATENT DOCUMENTS

| | | |
|---|---|---|
| CN | 202373838 U | 8/2012 |
| CN | 103560441 A | 2/2014 |
| CN | 104518393 A | 4/2015 |
| CN | 104821521 A | 8/2015 |
| CN | 104979740 A | 10/2015 |
| CN | 106451253 A | 2/2017 |
| CN | 206135313 U | 4/2017 |
| CN | 107306021 A | 10/2017 |
| CN | 206685810 U | 11/2017 |
| CN | 107453188 A | 12/2017 |
| CN | 207765893 U | 8/2018 |
| DE | 20117063 U1 | 1/2002 |
| FR | 2282179 A1 | 3/1976 |
| FR | 2920922 A1 | 3/2009 |
| JP | H09182237 A | 7/1997 |

OTHER PUBLICATIONS

U.S. Appl. No. 17/309,690, filed Jun. 15, 2021, naming inventors Gundel et al.
U.S. Appl. No. 17/309,755, filed Jun. 17, 2021, naming inventors Gundel et al.
International Preliminary Report on Patentability from International Application No. PCT/US2019/067970, dated Jul. 1, 2021, 14 pp.
International Search Report and the Written Opinion from International application No. PCT/US2019/067970 dated Apr. 17, 2020, 20 pgs.

* cited by examiner

ELECTRICAL POWER CABLE PREPARATION SYSTEM

This application claims the benefit of U.S. Provisional Patent Application Ser. No. 62/784,214, entitled "ELECTRICAL POWER CABLE PREPARATION SYSTEM," and filed on Dec. 21, 2018, and U.S. Provisional Patent Application No. 62/846,351, entitled "ELECTRICAL POWER CABLE PREPARATION DEVICE", and filed on May 10, 2019, the entire content of which are incorporated herein by reference.

TECHNICAL FIELD

The present disclosure relates to the field of electrical equipment, including power cables and accessories, for power utilities.

BACKGROUND

Electrical power grids include numerous components that operate in diverse locations and conditions, such as above ground, underground, cold weather climates, hot weather climates, etc. When a power grid suffers a failure, it can be difficult to determine the cause of the failure. For example, a power grid may include hundreds or thousands of discrete components, such as transformers, cables, cable splices, etc., and a failure in the power grid may be caused by a failure in any single component or a collection of the components. The root cause of such failures may include human error in installation, manufacturing defects, or wear and tear on the component, among other causes. While replacement of the electrical components can be costly, simply finding the fault can be time consuming and expensive. If a component fails in service, the total cost can include downtime for customer operations, liability, safety, or regulatory scrutiny, in addition to the actual costs incurred to locate and replace faulty components. Further, faulty components may pose a safety risk to utility workers, civilians, homes, buildings, or other infrastructure.

SUMMARY

The present disclosure provides techniques for preparing electrical cables to connect to cable accessories for use in a power grid. According to examples of this disclosure, a system includes a cable preparation device configured to cut one or more layers of an electrical cable, a cross-section sensing module configured to image the end-face of an electrical cable, and a computing device (e.g., one or more processors) configured to determine at least one dimension of a layer of an electrical cable based on the image and to control the cable preparation device to automatically cut the one or more layers of the electrical cable for coupling the electrical cable to a cable accessory (e.g., a cable splice body or a termination). In one example, the computing device determines a target cutting depth and a target cutback length associated with one or more respective layers of the electrical cable. The computing device determines whether an actual cutting depth and/or cutback length satisfies the target cutting depth and/or cutback length, respectively. In some examples, the computing device detects defects in the electrical cable. In another example, the computing device determines whether the cable preparation device should be serviced.

In this way, the computing device may enable a cable preparation device to prepare an electrical cable faster and control the cutting depth and cutback length of cuts to one or more layers of an electrical cable more accurately than other techniques. Cutting the layers of the electrical cable more accurately may reduce defects in the electrical cable (e.g., in a cable splice). For example, cutting the layers more accurately may reduce air voids, and hence the decrease the probability and/or quantity of partial discharge events. Reducing the probability and/or quantity of partial discharge events may decrease the probability of failure events of the electrical cable and increase the life expectancy of the electrical cable. Reducing the probability of failure events may increase the reliability of the power grid. Further, increasing life expectancy of the electrical cable may decrease costs of constructing, operating, and maintaining the power grid.

In one example, this disclosure is directed to a device comprising a camera configured to capture at least one image an end-face of an electrical cable, a housing configured to position the end-face of the electrical cable substantially perpendicular to an optical axis of the camera and at an imaging distance from the camera, and at least one optical marker configured to indicate a diameter of the electrical cable.

In another example, this disclosure is directed to a system comprising a cross-section sensing module. The cross-section sensing module comprises a camera configured to capture at least one image an end-face of an electrical cable, a housing configured to position the end-face of the electrical cable substantially perpendicular to an optical axis of the camera and at an imaging distance from the camera, and at least one optical marker configured to indicate a diameter of the electrical cable. The system further comprises an electrical cable preparation device configured to cut at least one layer of an electrical cable, and a computing device configured to receive the at least one image.

In a further example, this disclosure is directed to a method comprising determining, by a processor, that an end-face of an electrical cable is positioned at an imaging distance from a camera, and positioning, by one or more hinged member, at least one optical marker at a predetermined distance from an outside surface of the electrical cable. The method further comprises capturing, by a camera communicatively coupled to the processor, an image of the end-face of the electrical cable and the at least one optical marker automatically upon determination that the end-face of the electrical cable is positioned at the imaging distance, and determining, by the processor, at least one layer dimension of the electrical cable based on the image.

In another example, this disclosure is directed to a device comprising a camera configured to capture at least one image of an end-face of an electrical cable, and a housing configured to position the end-face of the electrical cable substantially perpendicular to an optical axis of the camera and at an imaging distance from the camera. In the example, image data based on the at least one image is indicative of at least one characteristic of the electrical cable.

The details of one or more examples of the disclosure are set forth in the accompanying drawings and the description below. Other features, objects, and advantages of the disclosure will be apparent from the description and drawings, and from the claims.

It is to be understood that the embodiments may be utilized and structural changes may be made without departing from the scope of the invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
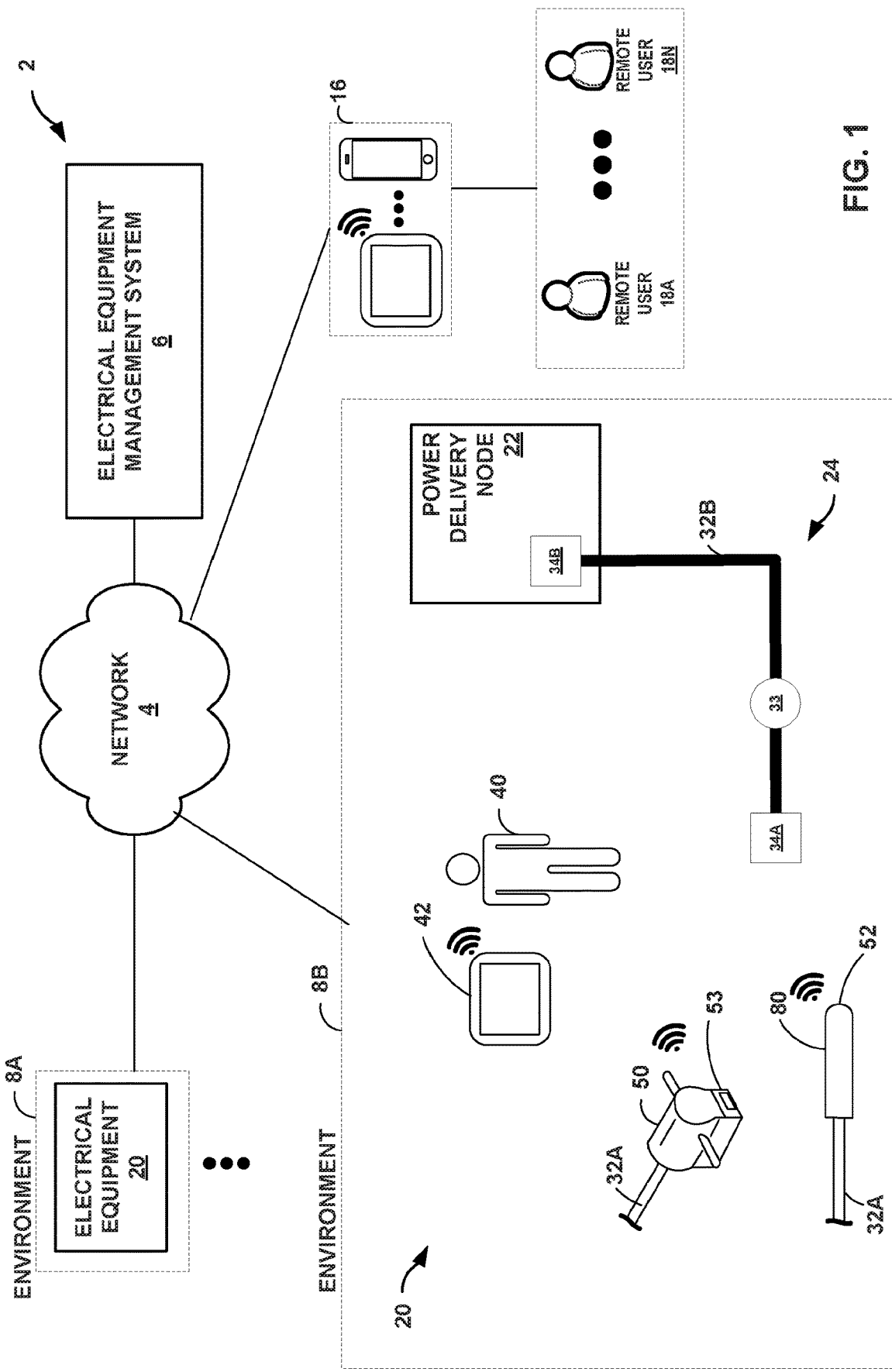
FIG. 1 is a block diagram illustrating an example system for preparing electrical cables for use within an electrical power grid, in accordance with various techniques of this disclosure.

FIG. 1 is a block diagram illustrating an example system 2 for automatically preparing electrical cables for use within an electrical power grid. In the example of FIG. 1, system 2 includes an electrical equipment management system (EEMS) 6 and one or more environments 8A-8B (collectively, environments 8) that include electrical equipment 20 (e.g., electrical cables 32 of power lines 24 and cable preparation device 50). As described herein, EEMS 6 may exchange information with cable preparation device 50 and cross-section sensing module 80 to enable efficient and accurate preparation of electrical cables 32 for installation within a power grid.

In general, EEMS 6 can provide one or more of data acquisition, monitoring, activity logging, data storage, reporting, predictive analytics, and alert generation. Moreover, EEMS 6 may provide information to cross-section sensing module 80 and cable preparation device 50 to enable cable preparation device 50 to cut various layers of electrical cables 32 and store information associated with electrical cables 32 that are imaged by cross-section sensing module 80 and prepared by cable preparation device 50 (e.g., images of the prepared electrical cables, date and/or location of the installation of the prepared electrical cables, amount of time used to prepare and install the prepared electrical cables 32, etc.). In addition, EEMS 6 may include an underlying analytics engine for predicting failure events of electrical cables 32 and an alerting system, in accordance with various examples described herein. In general, a failure event may refer to interruption of electrical power delivery between an electrical power source and an electrical power consumer, for example, caused by deterioration or breakage of an article of electrical equipment (e.g., a cable splice).

As further described below, EEMS 6 may include an integrated suite of electrical equipment management tools and implements various techniques of this disclosure. That is, EEMS 6 provides a system for managing electrical equipment (e.g., electrical cables, splices, transformers, etc.) within one or more physical environments 8, which may be cities, neighborhoods, buildings, construction sites, or any physical environment. In some examples, the environments 8 may include environments that are not communicatively coupled via network 4 to EEMS 6, other environment, or other computing devices 16. The techniques of this disclosure may be realized within various parts of system 2.

As shown in the example of FIG. 1, system 2 represents a computing environment in which a computing device within of a plurality of physical environments 8A, 8B (collectively, environments 8) electronically communicate with EEMS 6 via one or more computer networks 4. Each of physical environment 8 represents a physical environment in which one or more electrical power lines 24 provide power from a power source (e.g., power plant) to one or more consumers (e.g., businesses, homes, government facilities, etc.). Environment 8A is shown as generally as having electrical equipment 20. Environment 8B is shown in expanded form, including for example, a plurality of articles of electrical equipment 20, such as one or more power delivery nodes 22, one or more power lines 24, one or more cross-section sensing modules 80, and one or more cable preparation devices 50.

Environment 8B includes one or more workers 40 that may utilize one or more computing devices 42. Computing devices 42 may be communicatively coupled to EEMS 6, computing device 52 of cross-section sensing module 80, and/or computing device 53 of cable preparation device 50 via wired and/or wireless communication. For example, computing devices 42, 52, and/or 53 may include a cellular radio (e.g., GSM, CDMA, LTE, etc.), Bluetooth® radio, WiFi® radio, low power wide area network (LPWAN), etc. As another example, computing devices 42, 52, and 53 may include a wired connection, such as a network interface card (e.g. such as an Ethernet card), an optical transceiver, or any other type of device that can send and/or receive data.

Power delivery nodes 22 may include any suitable device from which power may be distributed. Power lines 24 may include any suitable electrical cable and/or cable accessories configured to transmit electrical power, e.g., having any suitable voltage or current, from power delivery node 22 a power source. Power lines 24 include electrical cables 32A-32B (collectively, electrical cables 32) and one or more electrical cable accessories 34A-34B (collectively, cable accessories 34). Each electrical cable 32 includes a conductor which may be radially surrounded by one or more layers of insulation. In some examples, electrical cables 32 include a plurality of stranded conductors (e.g., a three-phase or multi-conductor cable). Example cable accessories 34 may include splices, separable connectors, terminations, and connectors, among others. In some examples, cable accessories 34 may include cable splices configured to couple (e.g., electrically and physically) two or more electrical cables 32. For example, as shown FIG. 1, cable accessory 34A is configured to electrically and physically couple cable 32A to cable 32B. In some examples, terminations may be configured to couple (e.g., electrically and physically) a cable 32 to additional electrical equipment, such as a transformer, switch gear, power substation, business, home, or other structure. For example, as shown FIG. 1, cable accessory 34B electrically and physically couple cable 32B to power delivery node 22 (e.g., to a transformer of the power delivery node 22).

System 2 may include one or more electrical cable monitoring devices 33 configured to monitor one or more conditions of an article of electrical equipment 20. For example, monitoring devices 33 may include one or more monitoring devices and/or electrical equipment management systems described in, U.S. Patent Application 62/729,367, entitled "ELECTRICAL POWER CABLE MANAGEMENT SYSTEM HAVING ANALYTICS ENGINE WITH INTEGRATED MONITORING, ALERTING, AND PRE-FAULT EVENT PREDICTION," filed Sep. 10, 2018, and in U.S. Patent Application 62/729,325, entitled "ELECTRICAL POWER CABLE MONITORING DEVICE USING LOW SIDE ELECTRODE AND EARTH GROUND SEPARATION," filed Sep. 10, 2018, U.S. Patent Application 62/729,320, entitled "SUPPORT STRUCTURE FOR CABLE AND CABLE ACCESSORY CONDITION MONITORING DEVICES,' filed Sep. 10, 2018, U.S. Patent Application 62/729,363, entitled "ELECTRICAL POWER CABLE MONITORING DEVICE INCLUDING PARTIAL DISCHARGE SENSOR," filed Sep. 10, 2018, which are incorporated herein by reference in their entirety.

System 2 includes computing devices 16 by which users 18A-18N (collectively, users 18) may interact with EEMS 6 via network 4. For purposes of example, the end-user computing devices 16 may be laptops, desktop computers, mobile devices, such as tablets, smart phones, and the like. Users 18 interact with EEMS 6 to control and actively manage many aspects of electrical equipment 20, such as accessing and viewing event records, analytics and reporting, and/or performing asset tracking and scheduling maintenance or replacement for individual pieces of electrical equipment 20, e.g., monitoring devices 33, electrical cables 32 and/or cable accessories 34. EEMS 6 may allow users 18 to create and complete digital checklists with respect to the maintenance and/or replacement procedures and to synchronize any results of the procedures from computing devices 16 to EEMS 6.

In some examples, EEMS 6 integrates an event processing platform configured to process hundreds, thousands, or millions of concurrent streams of events from monitoring devices 33 that monitor respective articles of electrical equipment 20 (e.g., cable accessories 34). An underlying analytics engine of EEMS 6 applies historical data and models to the inbound streams to compute assertions, such as identified anomalies or predicted occurrences of failure events based on data from sensors of electrical equipment 20. Further, EEMS 6 may provide real-time alerting and reporting to notify users 18 of any predicted events, anomalies, trends, and the like.

The analytics engine of EEMS 6 may, in some examples, apply analytics to identify relationships or correlations between sensor data, environmental conditions, geographic regions, or other factors and analyze the impact on failure events. In some examples, EEMS 6 may determine a health of one or more cables accessories 34 or other electrical equipment. For example, EEMS 6 may determine, based on the data acquired across populations of electrical equipment 20, circumstances that lead to, or are predicted to lead to, failure events.

In some examples, EEMS 6 may determine whether an article of electrical equipment 20 should be repaired or replaced, prioritize maintenance (e.g., repair or replacement) procedures, create work orders, assign individuals or crews to perform the maintenance procedures, etc. EEMS 6 may, according to some examples, recommend re-routing electrical power or automatically re-route electrical power based on the analysis results.

EEMS 6 may process data for one or more entities, such as power utilities. For example, EEMS 6 may receive event data from electrical equipment of a single power utility and may provide analytics and reporting for the single power utility. As another example, EEMS 6 may receive event data from multiple power utilities and provide analytics and reporting for each of the power utilities. By receiving data from multiple power utilities, EEMS 6 may provide more robust prediction capabilities, for example, by training machine learning models with a larger data set than individual power utilities each utilizing a separate EEMS 6.

In this way, EEMS 6 integrates comprehensive tools for managing electrical equipment 20 with an underlying analytics engine and communication system to provide data acquisition, monitoring, activity logging, reporting, and alert generation. Moreover, EEMS 6 provides a communication system for operation and utilization by and between the various elements of system 2. Users 18 may access EEMS 6 to view results on any analytics performed by EEMS 6 on data acquired from monitoring devices 33. In some examples, EEMS 6 may present a web-based interface via a web server (e.g., an HTTP server) or client-side applications may be deployed for computing devices 16 used by users 18.

In some examples, EEMS 6 may provide a database query engine for directly querying EEMS 6 to view acquired event (e.g., sensor) data and any results of the analytic engine, e.g., by the way of dashboards, alert notifications, reports and the like. That is, users 18, or software executing on computing devices 16, may submit queries to EEMS 6 and receive data corresponding to the queries for presentation in the form of one or more reports or dashboards. Such dashboards may provide various insights regarding system 2, such as baseline (e.g. normal) operation across environments 8, identifications of any anomalous environments and/or electrical equipment 20, identifications of any geographic regions within environments 2 for which unusual activity (e.g., failure events) has occurred or is predicted to occur, and the like.

As illustrated in detail below, EEMS 6 may simplify workflows for individuals charged with monitoring electrical equipment 20 for an entity or environment. That is, the techniques of this disclosure may enable active electrical equipment management and allow an organization to take preventative or correction actions with respect to particular pieces of electrical equipment.

As one example, the underlying analytical engine of EEMS 6 may be configured to compute and present metrics for electrical equipment within a given environment 8 or across multiple environments for an organization. For example, EEMS 6 may be configured to acquire data and provide aggregated failure metrics and predicted failure analytics across one or more environments 8. Furthermore, users 18 may set benchmarks for occurrence of any failure events, and EEMS 6 may track actual failure events relative to the benchmarks.

As another example, EEMS 6 may further trigger an alert if certain combinations of conditions are present, e.g., to accelerate examination or service of one or more articles of electrical equipment 20, such as one of cable accessories 34. In this manner, EEMS 6 may identify an individual article of electrical equipment 20 predicted to fail and prompt users 18 to inspect and/or replace the article of electrical equipment prior to failure of the article.

EEMS 6 may be communicatively coupled to cable preparation device 50. In one example, as described further below, EEMS 6 may provide information to cable preparation device 50 to enable cable preparation device 50 to cut various layers of electrical cables 32. For instance, EEMS 6 may store information for different types electrical cables 32, such as the depth of each layer of a respective type of electrical cable 32, and may provide such information to cable preparation device 50 for cutting the layers of electrical cables 32. As another example, EEMS 6 may store information associated with electrical cables 32 that are prepared by cable preparation device 50, such as a date and location when the electrical cable 32 was prepared and installed, amount of time used to prepare and install the prepared electrical cables 32, images of the electrical cable 32 during and/or after the preparation and installation, etc.).

Cable preparation device 50 is configured to automatically cut one or more layers of electrical cable 32A to prepare electrical cable 32A for coupling to a cable accessory (e.g., cable accessory 34A). In some examples, cable preparation device 50 may include any one or more of the cable preparation devices described in U.S. Provisional Patent Application No. 62/784,214, entitled "ELECTRICAL POWER CABLE PREPARATION SYSTEM", and filed on May 10, 2019, the entire content of which is incorporated herein by reference. Cable preparation device 50 may be configured to automatically remove various layers (e.g., a cable jacket layer, a shield layer, an insulation layer, an insulation screen layer, a conductor screen layer, or other layers) of electrical cable 32A as the layers are cut. For example, as illustrated and described in later FIGS., cable preparation device 50 may include one or more cutting tools (e.g., knife blades, saws, etc.) that are configured to cut the various layers of electrical cable 32A.

Cable preparation device 50 includes a computing device 53 configured to control operation of the cable preparation device 50. For example, computing device 53 may control a cut depth and cutback length of the cutting tools as cable preparation device 50 cuts various layers of electrical cable 32A. In general, computing device 53 may be any computing platform having one or more processors that provide an execution environment of programmable instructions. For example, computing device 53 may be one or more computers (e.g., servers) coupled to cable preparation device or may be one or more processors embedded within cable preparation device 50, such as on one or more printed circuit boards. Computing device 53 may be communicatively coupled to other computing devices (e.g., computing device 52, computing device 42, and/or EEMS 6). As one example, computing device 53 may include a communication unit (e.g., wired and/or wireless) to communicate (e.g. via network 4) with EEMS 6. Example wireless communication units include WiFi®, Bluetooth®, or RFID devices, among others. Example wired communication units include networking cards, universal serial bus (USB) devices, among others.

EEMS 6 may be communicatively coupled to cross-section sensing module 80. In one example, as described further below, EEMS 6 may provide information to cross-section sensing module 80 to enable cross-section sensing module 80 to determine validation of electrical cables 32, e.g. validating the type and parameters of electrical cables 32. For instance, EEMS 6 may store information for different types electrical cables 32, for example, electrical cable characteristics such as the depth, material, color, radii, and other parameters of each layer of a respective type of electrical cable 32, and may provide such information to cross-section sensing module 80 for validating electrical cables 32. As another example, EEMS 6 may store information associated with electrical cables 32 that are imaged by cross-section sensing module 80, such as a date and location when the electrical cable 32 was imaged and the images of the electrical cable 32 captured by cross-section sensing module 80, etc.).

Cross-section sensing module 80 is configured to automatically capture an image of an end-face of electrical cable 32A to determine parameters of electrical cable 32A in preparation for coupling electrical cable 32A to a cable accessory (e.g., cable accessory 34A). In some examples, the at least one image captured by cross-section sensing module 80 includes information relating to the electrical cable as described above, e.g. electrical cable characteristics, and may be used to indicate information relating to the electrical cable. Cross-section sensing module 80 may be configured to automatically determine parameters of electrical cable 32A based on one or more captured images as the layers are cut, e.g. before and after one or more layers are cut. In some examples, image data may be determined based on the at least one captured image by cross-section sensing module 80, e.g. via image processing. Electrical cable characteristics, such as depth, material, color, radii, and other parameters of each layer of a respective type of electrical cable 32, may be determined from image data.

Cross-section sensing module 80 includes a computing device 52 configured to control operation of the cross-section sensing module 80. For example, computing device 52 may control one or more sensors and/or cameras of cross-section sensing module 80 to capture and/or process one or more images an end-face of electrical cable 32A. In general, computing device 52 may be any computing platform having one or more processors that provide an execution environment of programmable instructions. For example, computing device may be one or more computers (e.g., servers) coupled to cable preparation device or may be one or more processors embedded within cross-section sensing module 80, such as on one or more printed circuit boards. Computing device 52 may be communicatively coupled to other computing devices (e.g., computing device 42, computing device 53, and/or EEMS 6). As one example, computing device 52 may include a communication unit (e.g., wired and/or wireless) to communicate (e.g. via network 4) with EEMS 6. Example wireless communication units include WiFi®, Bluetooth®, or RFID devices, among others. Example wired communication units include networking cards, universal serial bus (USB) devices, among others.

As described herein, a computing device (such as any one or more of computing device 52, computing device 53, computing device 42, EEMS 6, or a combination thereof) may determine target cutting distances (e.g., a target cutting depth and/or a target cutback length) and parameters for respective layers of electrical cable 32A. As used throughout this disclosure, the cutback length refers to a distance along a longitudinal axis of electrical cable 32A (e.g., an axis co-axial with an axis of electrical cable 32A) and the cutting depth refers to a distance extending radially from the longitudinal axis of electrical cable 32A.

In some examples, one or more of computing device 52, 53, 42 and/or EEMS 6 automatically determine the parameters and target cutting distances data stored within a repository (e.g., database) specifying cutting distances based on a type of electrical cable 32A. A type of electrical cable 32A may, for example, refer to combinations of one or more of a manufacturer of electrical cable 32A, electrical rating (e.g., voltage and/or current rating) of electrical cable 32A, a geographic location in which the electrical cable is intended to be used (e.g., United States, Europe, etc.), a construction of the electrical cable (e.g., copper conductor vs aluminum conductor), among other types.

In some example implementations, a computing device (e.g., computing device 52, computing device 53) automatically determines the type of electrical cable 32A to be prepared based on, for example, on identification information for electrical cable 32A, which may be automatically acquired by the cross-section sensing module 80 and/or cable preparation device 50. For example, computing devices 52 and/or 53 may include a barcode scanner and/or camera to detect a code (e.g., a QR code) on electrical cable 32A, receive the identification information encoded in the code, and determine the type of electrical cable 32A based on the code. As another example, computing devices 52 and/or 53 may detect text of other identification information on electrical cable 32A (e.g., using a camera and optical character recognition) to determine the type of electrical cable 32A. As a further example, computing device 52 may determine identification information of electrical cable 32A based on captured images of the end-face of electrical cable 32A.

In some scenarios, worker 40 may utilize computing device 42 to scan a code or text on electrical cable 32A. For instance, computing device 42 may include a camera or barcode scanner to detect a code, text, or other identification information on electrical cable 32A. Computing device 42 may determine the identification information for electrical cable 32A and send the identification information to computing devices 52 and/or 53, such that computing devices 52 and/or 53 may determine the type of electrical cable 32A. As another example, computing device 42 may determine the type of electrical cable 32A and send data indicating the type of electrical cable 32A to computing devices 52 and/or 53.

Computing devices 52 and/or 53 may determine the target cutting distances based at least in part on the type of electrical cable 32A. For example, computing devices 52 and/or 53 may include a data store that stores data indicating the target cutting distances associated with a respective type of electrical cable. Computing devices 52 and/or 53 may store data, such as data indicating the target cutting distances associated with a respective type of electrical cable, in a lookup table or the like, and may query the lookup table, data store, etc., for data. As another example, computing device 42 and/or EEMS 6 may include data indicating the target cutting distances associated with a respective type of electrical cable. Computing devices 52 and/or 53 may query computing device 42 and/or EEMS 6 to determine the target cutting distances. In some instances, EEMS 6 and/or computing devices 52 and/or 53 may determine the type of electrical cable 32A, determine the target cutting distances associated with the type of electrical cable 32A, and output data indicating the target cutting distances to computing devices 52 and/or 53.

Computing device 52, computing device 53, computing device 42, and/or EEMS 6 may determine the target cutting distances associated with one or more layers of electrical cable 32A based at least in part on a cable accessory 34A to which electrical cable 32A is to be coupled to. For example, computing devices 52 and/or 53 may determine the target cutback length based on characteristics of a cable accessory 34A, such as, for example, a length of cable accessory 34A, a size of a connector of cable accessory 34A, a length or size of other internal structures of cable accessory 34A, operator preference, installation instructions, or the like. In some examples, computing devices 52 and/or 53 determines the target cutting distances associated with a layer of electrical cable 32 based on the type of electrical cable 32A and a type of cable accessory 34A.

In some examples, computing device 52 determines one or more target cutting distances based at least in part on one or more images of electrical cable 52. For example, cross-section sensing module 80 may include one or more cameras configured to generate images of electrical cable 32A. In one example, computing device 52 determines a target cutting depth for respective layers of electrical cable 32A using images of a cross-sectional view of electrical cable 32A. Computing device 52 may determine a scale of the images based on known distances of one or more objects in the image. In one scenario, computing device 52 includes a laser, light emitting diode (LED), or other light emitting device configured to illuminate at least a portion of electrical cable 32A with a predetermined pattern of light. The one or more images captured by the camera include the predetermined pattern of light, such that computing device 52 may determine the depth of the respective layers based on the known size of the predetermined pattern of light.

Target cutting distances may be input by worker 40 (e.g., via computing device 42, computing device 52, or computing device 53). Computing devices 52 and/or 53 may output a notification requesting confirmation of the target cutting distances from worker 40 prior to cutting one or more layers of electrical cable 32A.

Responsive to determining the target cutting distances, computing device 53 may control target cutting device to cut one or more layers of electrical cable based on the target cutting distances associated with the respective layers. For example, computing device 53 causes the cutting tools to move longitudinally (also referred to as axially) along an axis of electrical cable 32A to cut each layer to the respective target cutback distance. As another example, computing device 53 causes the cutting tools to move radially to cut each layer to the respective target cutting depth.

In some examples, computing device 53 calibrates the position of the one or more cutting tools to move the respective actual position of the one or more cutting tools to a designated starting position for the cut. In other words, computing device 53 may determine whether the at least one cutting tool is actually positioned at the starting position for the cut. In some examples, a radial starting position is located on the surface of the layer to be cut. In such examples, computing device 53 determines whether the at least one cutting tool is radially located on the surface of the layer to be cut. In some examples, a longitudinal starting position is located at a longitudinal reference position (also referred to as a zero point or zero position). The longitudinal zero point may be the end of electrical cable 32A or an arbitrary longitudinal position. In some examples, the longitudinal reference position may be located the target cutback distance from the zero position. In some examples, computing device 53 sets the longitudinal reference position to be the end of the electrical cable 32A. For example, computing device 53 may cause the one or more cutting tools to cut through all of the layers of electrical cable 32A and may set the longitudinal zero position to be the longitudinal position of the cutting tool at which cable preparation device 50 cut through all of the layers of electrical cable 32A.

Computing device 53 may determine whether the at least one cutting tool is actually positioned at the starting position for the cut based at least in part on one or more images. For example, computing device 53 may determine whether the at least one cutting tool is radially positioned at a surface of the layer to be cut based on one or more images. Similarly, computing device 53 may determine whether the at least one cutting tool is longitudinally positioned at the longitudinal reference position based on the one or more images.

In some instances, computing device 53 determines whether the at least one cutting tool is actually positioned at the radial starting position for the cut based at least in part on an amount of mechanical resistance or force experienced by the at least one cutting tool as the at least one cutting tool is moved radially towards electrical cable 32A. In such instances, the mechanical resistance increases as the at least one cutting tool contacts the surface of the layer to be cut and computing device 53 determines that the at least one cutting tool is actually positioned at the radial starting position (e.g., at the surface of the layer to be cut) in response to determining that the mechanical resistance satisfies (e.g., is greater than or equal to) a threshold mechanical resistance.

According to one or more examples, computing device 53 determines whether the at least one cutting tool is actually positioned at the radial starting position for the cut based at least in part the electrical characteristics of the at least one cutting tool. For example, computing device 53 may determine the electrical resistance or capacitance of the cutting tool relative to another component of the cable preparation device 50 as the cutting tool moves radially. For example, computing device 53 may determine that the cutting tool has reached the surface of a particular layer of electrical cable 32A in response to detecting a change in the electrical resistance or capacitance (e.g., the electrical characteristic increases or decreases by more than a threshold amount).

Computing device 53 determines whether the actual cutting distance satisfies the target cutting distances. In one example, computing device 53 determines whether the actual depth or cutback length of the cut performed by the one or more cutting tools satisfies the target cutting depth or target cutback length, respectively.

Computing device 52 may determine the actual depth and/or cutback length of the cut performed by the cutting tools based on one or more images of electrical cable 32A. For example, one or more cameras of cross-section sensing module 80 may generate one or more images of a cross-sectional of electrical cable 32, of a longitudinal surface of electrical cable 32, or both. The one or more cameras may generate images of electrical cable 32A during and/or after cutting electrical cable 32A. In some examples, computing device 52 determines the actual cutting distances (e.g., cutback length) based on a contrast in color of the various layers of electrical cable 32A. For example, a first layer (e.g., an insulation layer) may be substantially one color (e.g., black) and the adjoining layer (e.g., an insulation shield layer) may be substantially another color (e.g., white) having a relatively large contrast to the first color. In some examples, computing device 52 determine a longitudinal boundary between the first layer and the second layer based on the color contrast. In such examples, computing device 52 determines the actual cutback length by determining the distance between the boundary and the zero point for the longitudinal direction.

Computing device 53 may determine the actual cutting depth of a layer based at least in part on the electrical characteristics of the layer. In some examples, computing device 53 may determine that the depth of the cut based on an electrical resistance or capacitance. In some examples, computing device 53 determines whether the actual cutting distance satisfies the target cutting distance by causing cable preparation device 50 to perform a number of test cuts.

Computing device 52 determines, in some examples, whether electrical cable 32A includes a defect. In some examples, computing device 52 determines whether electrical cable 32A includes a defect by determining whether a diameter of a respective layer satisfies the target or threshold diameter. For example, a camera of cross-section sensing module 80 may take one or more images of a cross-sectional view of electrical cable 32A and computing device 52 may determine the diameter of a layer based on one or more images. Computing device 52 may determine a scale of the images based on known distances of one or more objects in the image. In one scenario, computing device 52 includes a laser, LED, or other light emitting device configured to illuminate at least a portion of electrical cable 32A with a predetermined pattern of light. The one or more images captured by the camera include the predetermined pattern of light, such that computing device 52 may determine the diameter of the respective layers based on the known size of the predetermined pattern of light.

In some examples, computing devices 52 and/or 53 determines whether electrical cable 32A includes a defect by determining whether the boundary between layers is crisp. In other words, computing devices 52 and/or 53 determines a variance in the longitudinal boundary between a one layer of electrical cable 32A and an adjacent layer of electrical cable 32A satisfies a threshold variance. In some examples, the boundary between layers may be uneven, such that the boundary between layers may closer to the longitudinal zero point in one location relative to the boundary be between layers at another location of the electrical cable. Computing devices 52 and/or 53 may determine the variance in the boundary based on one or more images of electrical cable 32. Responsive to determining that the variance satisfies (e.g., is greater than or equal to) a threshold variance, computing devices 52 and/or 53 may determine that electrical cable 32A includes a defect. In some examples, computing devices 52 and/or 53 may cause the cutting tools of cable preparation device 50 to re-cut one or more layers of electrical cable 32A in response to determining the boundary between layers is not crisp.

Computing devices 52 and/or 53 may determine whether electrical cable 32A includes defects by determining whether any layers of electrical cable 32A include cuts, gouges, or is otherwise missing material where the layer should include material for that layer. In some instances, computing devices 52 and/or 53 determines whether electrical cable 32A includes cuts or gouges based on one or more images of electrical cable 32A. Computing devices 52 and/or 53 may determine that electrical cable 32A includes a defect in response to determining that one or more layers of electrical cable 32A include a cut or gouge. In some examples, computing devices 52 and/or 53 may cause the cutting tools of cable preparation device 50 to re-cut one or more layers of electrical cable 32A in response to determining one or more layers includes a cut or gouge.

As another example, computing devices 52 and/or 53 may determine that electrical cable 32A includes a defect in response to determining that a surface of one or more layers of electrical cable 32A includes debris. The debris may include a portion of a layer which should have been removed but which remains attached to electrical cable 32A. In some instances, computing devices 52 and/or 53 determines, using cross-sectional sensing module 80 or another camera, whether the surface of one or more layers include debris based on one or more images of electrical cable 32A. In some examples, cable preparation device 50 may include a debris removal device, such as a vacuum, a brush, or a blower.

Computing device 52, computing device 53, computing device 42, and/or EEMS 6 may determine whether cable preparation device 50 and/or cross-section sensing module 80 should be serviced. In one example, computing devices 52 and/or 53 determines whether cable preparation device 50 and/or cross-section sensing module 80 should be serviced by determining whether cable preparation device 50 is aligned properly, for example, based on image data.

In some examples, computing device 52, computing device 53, computing device 42, or EEMS 6 may utilize machine learning to determine characteristics of electrical cable preparation that contribute to failure of electrical cables 32. For example, computing devices 52 and/or 53 or EEMS 6 may store cable preparation data (e.g., image data of electrical cables 32, dimensions of cuts associated with respective layers of electrical cables 32, types of electrical cables 32, cutting techniques for cutting layers of electrical cables 32, etc.) for a plurality of electrical cables 32 and known failure events of electrical cables 32. Computing devices 52 and/or 53 and/or EEMS 6 may train a model based on the cable preparation data to determine characteristics of a cable or cable preparation associated with failure events of electrical cables. In one example, computing devices 52 and/or 53 and/or EEMS 6 may determine, based on the cable preparation data, a relationship between life expectancy of an electrical cable and different types of cuts or different cutting dimensions. As another example, computing devices 52 and/or 53 and/or EEMS 6 may determine that certain types of electrical cables 32 may be more likely to fail if the boundary between layers is not very crisp or if a diameter of one or more layers is too small, and that other types of electrical cables 32 may be more tolerant (e.g., less likely to fail) to variations in layer distances. In this way, computing devices 52 and/or 53 and/or EEMS 6 may train one or more models to learn the which characteristics of the cable preparation increase the probability that the electrical cable 32 is will last and/or which characteristics increase the probability that the electrical cable 32 will fail prematurely.

Computing devices 52, 53 and/or EEMS 6 may perform at least one operation based on the models. For example, computing device 52 may update one or more cutting rules for cable preparation device 50. For instance, computing device 52 may update cutting rules associated with a type of electrical cable 32, such as a target cutting depth, target cutback distance, application of grease, cutting shape (e.g., straight, taper, or bevel), or application of heat.

In some examples, computing devices 52, 53 and/or EEMS 6 applies one or more models (e.g., in real time) to determine whether electrical cable 32A will fail prematurely. For example, computing device 52 may apply a model to cable preparation data for electrical cable 32A to predict whether electrical cable 32A will fail prematurely. As one example, computing device 52 may determine that the electrical cable 32A is likely to fail prematurely based on the current cutting distances (e.g., depth or cutback distance) of the layers. In such examples, EEMS 6 may output a notification (e.g., to computing device 52 or 42) indicating that electrical cable 32A should be re-cut.

In some examples, computing device 52 may cause cable preparation device 50 to apply a lubricant to one or more layers of electrical cable 32A after cutting the one or more layers.

In this way, the computing device may enable a cable preparation device to prepare an electrical cable faster and control the cutting depth and cutback length of cuts to one or more layers of an electrical cable more accurately than other techniques. Cutting the layers of the electrical cable more accurately may reduce defects in the electrical cable (e.g., in a cable splice). For example, cutting the layers more accurately may reduce air voids, and hence the decrease the probability and/or quantity of partial discharge events. Reducing the probability and/or quantity of partial discharge events may decrease the probability of failure events of the electrical cable and increase the life expectancy of the electrical cable. Reducing the probability of failure events may increase the reliability of the power grid. Further, increasing life expectancy of the electrical cable may decrease costs of constructing, operating, and maintaining the power grid.

Figure 2:
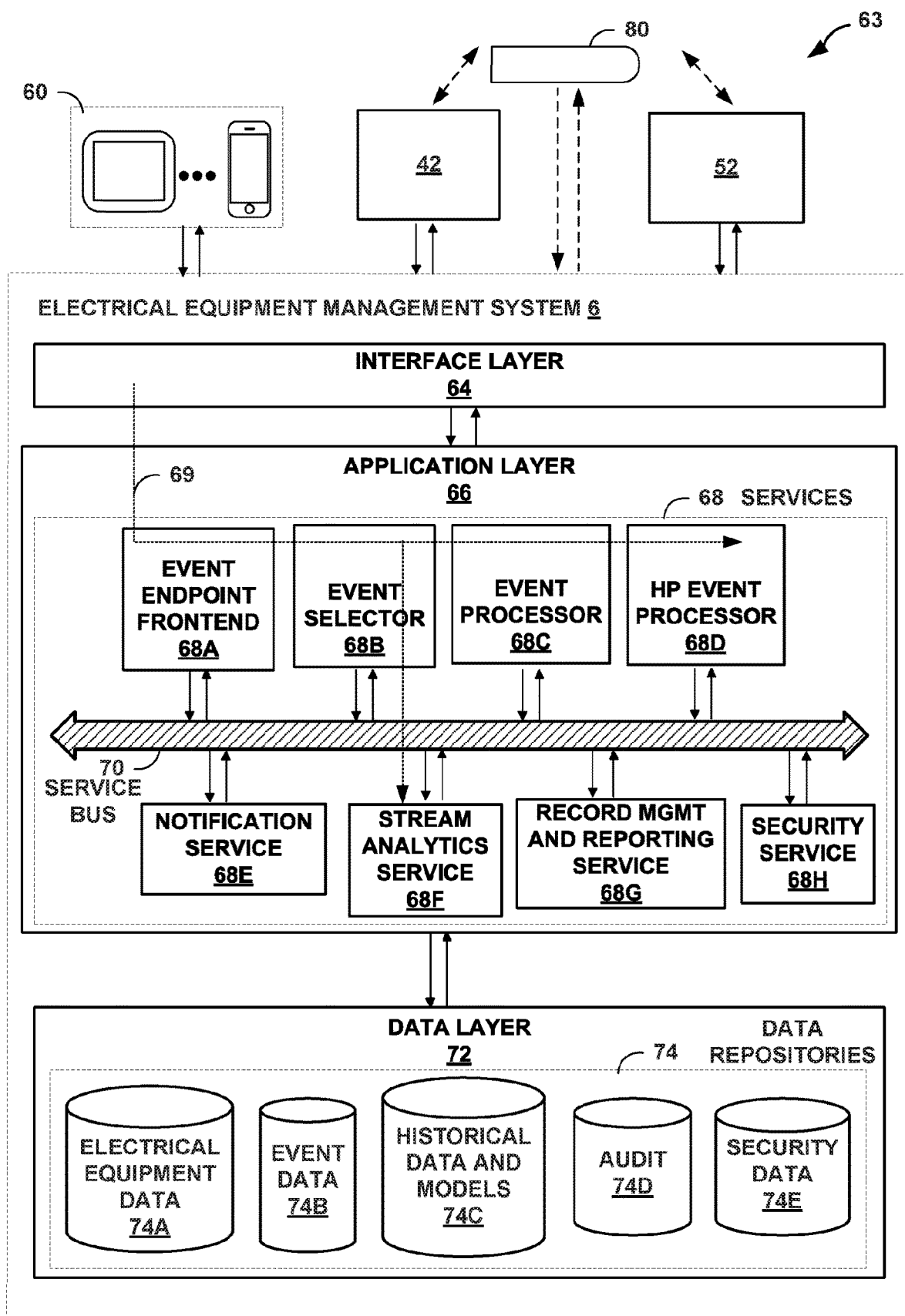
FIG. 2 is a block diagram illustrating an operating perspective of the electrical equipment management system shown in FIG. 1, in accordance with various techniques of this disclosure.

FIG. 2 is a block diagram providing an operating perspective of EEMS 6 when hosted as cloud-based platform capable of supporting multiple, distinct environments 8 each having a plurality of articles of electrical equipment 20. In the example of FIG. 2, the components of EEMS 6 are arranged according to multiple logical layers that implement the techniques of the disclosure. Each layer may be implemented by one or more modules comprised of hardware, software, or a combination of hardware and software.

In FIG. 2, cross-section sensing module 80, computing device 52, and/or computing device 42 operate as clients 63 that communicate with EEMS 6 via interface layer 64. Computing devices 60 typically execute client software applications, such as desktop applications, mobile applications, and web applications. Computing devices 60 may represent any of computing devices 16 of FIG. 1. Examples of computing devices 60 may include, but are not limited to, a portable or mobile computing device (e.g., smartphone, wearable computing device, tablet), laptop computers, desktop computers, smart television platforms, and servers, to name only a few examples.

As further described in this disclosure, cross-section sensing module 80, computing device 52, and/or computing device 42 communicate with EEMS 6 to provide streams of data to EEMS 6 and receive from EEMS 6 alerts, configuration data, and other communications. Client applications executing on computing devices 60 may communicate with EEMS 6 to send and receive data that is retrieved, stored, generated, and/or otherwise processed by services 68A-68H (collectively, services 68). For instance, the client applications may request and edit event data including analytical data stored at and/or managed by EEMS 6. In some examples, the client applications may request and display aggregate event data that summarizes or otherwise aggregates numerous individual instances of failure events and corresponding data acquired from monitoring devices 33 and/or generated by EEMS 6. The client applications may interact with EEMS 6 to query for analytics data about past and predicted failure events. In some examples, the client applications may output (e.g., for display) data received from EEMS 6 to visualize such data for users of clients 63. As further illustrated and described in below, EEMS 6 may provide data to the client applications, which the client applications output for display in user interfaces.

Clients applications executing on computing devices 60 may be implemented for different platforms but include similar or the same functionality. For instance, a client application may be a desktop application compiled to run on a desktop operating system, or may be a mobile application compiled to run on a mobile operating system. As another example, a client application may be a web application such as a web browser that displays web pages received from EEMS 6. In the example of a web application, EEMS 6 may receive requests from the web application (e.g., the web browser), process the requests, and send one or more responses back to the web application. In this way, the collection of web pages, the client-side processing web application, and the server-side processing performed by EEMS 6 collectively provides the functionality to perform techniques of this disclosure. In this way, client applications use various services of EEMS 6 in accordance with techniques of this disclosure, and the applications may operate within various different computing environment (e.g., embedded circuitry or processor of a desktop operating system, mobile operating system, or web browser, to name only a few examples).

As shown in FIG. 2, EEMS 6 includes an interface layer 64 that represents a set of application programming interfaces (API) or protocol interface presented and supported by EEMS 6. Interface layer 64 initially receives messages from any of clients 63 for further processing at EEMS 6. Interface layer 64 may therefore provide one or more interfaces that are available to client applications executing on clients 63. In some examples, the interfaces may be application programming interfaces (APIs) that are accessible over a network. Interface layer 64 may be implemented with one or more web servers. The one or more web servers may receive incoming requests, process and/or forward data from the requests to services 68, and provide one or more responses, based on data received from services 68, to the client application that initially sent the request. In some examples, the one or more web servers that implement interface layer 64 may include a runtime environment to deploy program logic that provides the one or more interfaces. As further described below, each service may provide a group of one or more interfaces that are accessible via interface layer 64.

In some examples, interface layer 64 may provide Representational State Transfer (RESTful) interfaces that use HTTP methods to interact with services and manipulate resources of EEMS 6. In such examples, services 68 may generate JavaScript Object Notation (JSON) messages that interface layer 64 sends back to the client application that submitted the initial request. In some examples, interface layer 64 provides web services using Simple Object Access Protocol (SOAP) to process requests from client applications. In still other examples, interface layer 64 may use Remote Procedure Calls (RPC) to process requests from clients 63. Upon receiving a request from a client application to use one or more services 68, interface layer 64 sends the data to application layer 66, which includes services 68.

Data layer 72 of EEMS 6 represents a data repository that provides persistence for data in EEMS 6 using one or more data repositories 74. A data repository, generally, may be any data structure or software that stores and/or manages data. Examples of data repositories include but are not limited to relational databases, multi-dimensional databases, maps, and hash tables, to name only a few examples. Data layer 72 may be implemented using Relational Database Management System (RDBMS) software to manage data in data repositories 74. The RDBMS software may manage one or more data repositories 74, which may be accessed using Structured Query Language (SQL). Data in the one or more databases may be stored, retrieved, and modified using the RDBMS software. In some examples, data layer 72 may be implemented using an Object Database Management System (ODBMS), Online Analytical Processing (OLAP) database or other suitable data management system.

Electrical equipment data 74A of data repositories 74 may include data corresponding to a plurality of articles of electrical equipment, such as cable accessories 34. In some examples, electrical equipment data 74A may include device or equipment data, manufacturing data, installation data, consumer data, power distribution data, among others. For example, electrical equipment data 74A may include, for each cable accessory of cable accessories 34, data identifying a date of manufacture, a date of installation, a location (e.g., GPS coordinates, street address, etc.), entity that installed the cable accessory, a unique identifier (e.g., serial number), a type of cable accessory, etc. For example, prior to joining electrical cables 32A and 32B of FIG. 1 with cable accessory 34A, an installer may scan (e.g., with one of computing devices 16, such as a mobile phone) a barcode on cable accessory 34A that includes device data representing a unique identifier, date of manufacture, and so forth, and may upload the device data to EEMS 6. In some instances, the mobile device may append data such as the current date as the date of installation and GPS coordinates to the device data, and may send the device data to EEMS 6, such that EEMS 6 may store the device data for cable accessory 34A in electrical equipment data 74A. As another example, equipment data may include data indicating cutting dimensions for various types of electrical cables and/or cable accessories.

EEMS 6 also includes an application layer 66 that represents a collection of services 68 for implementing much of the underlying operations of EEMS 6. Application layer 66 receives data included in requests received from client devices 63 and further processes the data according to one or more of services 68 invoked by the requests. Application layer 66 may be implemented as one or more discrete software services executing on one or more application servers, e.g., physical or virtual machines. That is, the application servers provide runtime environments for execution of services 68. In some examples, the functionality interface layer 64 as described above and the functionality of application layer 66 may be implemented at the same server.

Application layer 66 may include one or more separate software services 68 (e.g., processes) that communicate with one another (e.g., via a logical service bus 70), as one example. Service bus 70 generally represents a logical interconnections or set of interfaces that allows different services to send messages to other services, such as by a publish/subscription communication model. For instance, each of services 68 may subscribe to specific types of messages based on criteria set for the respective service. When a service publishes a message of a particular type on service bus 70, other services that subscribe to messages of that type will receive the message. In this way, each of services 68 may communicate data to one another. As another example, services 68 may communicate in point-to-point fashion using sockets or other communication mechanism.

Each of services 68 is implemented in a modular form within EEMS 6. Although shown as separate modules for each service, in some examples the functionality of two or more services may be combined into a single module or component. Each of services 68 may be implemented in software, hardware, or a combination of hardware and software. Moreover, services 68 may be implemented as standalone devices, separate virtual machines or containers, processes, threads or software instructions generally for execution on one or more physical processors. In some examples, one or more of services 68 may each provide one or more interfaces that are exposed through interface layer 64. Accordingly, client applications of computing devices 60 may call one or more interfaces of one or more of services 68 to perform techniques of this disclosure.

In accordance with techniques of the disclosure, services 68 may include an event processing platform including an event endpoint frontend 68A, event selector 68B, and event processor 68C. Event endpoint frontend 68A operates as a front-end interface for receiving and sending communications to cross-section sensing module 80, computing device 52, and/or computing device 42. In other words, event endpoint frontend 68A operates to as a front line interface to monitoring devices 33 deployed within environments 8 of FIG. 1. Event endpoint frontend 68A may be implemented as a plurality of tasks or jobs spawned to receive individual inbound communications of event streams 69 from the monitoring devices 33 (e.g. integrated within cable accessories 34) carrying data sensed and captured by sensors of the monitoring devices 33. When receiving event streams 69, for example, event endpoint frontend 68A may spawn tasks to quickly enqueue an inbound communication, referred to as an event, and close the communication session, thereby providing high-speed processing and scalability. Each incoming communication may, for example, carry recently captured data representing sensed conditions, motions, temperatures, actions or other data, generally referred to as events. Communications exchanged between the event endpoint frontend 68A and the cable accessories 34 may be real-time or pseudo real-time depending on communication delays and continuity.

Event selector 68B operates on the stream of events 69 received from cross-section sensing module 80 computing device 52, and/or computing device 42 via frontend 68A and determines, based on rules or classifications, priorities associated with the incoming events. Based on the priorities, event selector 68B enqueues the events for subsequent processing by event processor 68C or high priority (HP) event processor 68D. Additional computational resources and objects may be dedicated to HP event processor 68D so as to ensure responsiveness to critical events, such as actual failure or predicted imminent failure of a cable accessory 34. Responsive to processing high priority events, HP event processor 68D may immediately invoke notification service 68E to generate alerts, instructions, warnings or other similar messages to be output to monitoring devices 33 or users 18 of computing devices 60. Events not classified as high priority are consumed and processed by event processor 68C.

In general, event processor 68C or high priority (HP) event processor 68D operate on the incoming streams of events to update event data 74B within data repositories 74. In general, event data 74B includes data indicative of sensor data obtained from monitoring devices 33 (e.g., integrated with cable accessories 34), device data for electrical equipment 20 of FIG. 1, analysis data, or a combination therein. For example, in some instances, event data 74B may include entire streams of samples of data obtained from sensors of monitoring devices 33. In other instances, event data 74B may include a subset of such data, e.g., associated with a particular time period. As another example, event data 74B may include analysis data indicating results of analysis of sensor data performed by one or more of cross-section sensing module 80, computing device 52, and/or computing device 42.

Event processors 68C, 68D may create, read, update, and delete event data stored in event data 74B. Event data may be stored in a respective database record as a structure that includes name/value pairs of data, such as data tables specified in row/column format. For instance, a name of a column may be "Accessory ID" and a value may be a unique identification number (e.g., unique identifier) corresponding to a particular article of electrical equipment 20 of FIG. 1. An event record may include data such as, but not limited to: equipment identification, data acquisition timestamp(s), and data indicative of one or more sensed parameters.

Event selector 68B may direct the incoming stream of events to stream analytics service 68F, which is configured to perform in depth processing of the incoming stream of events to perform real-time analytics. Stream analytics service 68F may, for example, be configured to process and compare multiple streams of event data 74B with historical data and models 74C in real-time as event data 74B is received. In this way, stream analytics service 68F may be configured to detect anomalies, transform incoming event data values, or trigger alerts upon predicting a possible failure event (e.g., failure of an article of electrical equipment 20). Historical data and models 74C may include, for example, one or more trained models configured to predict whether a failure vent will occur, an expected remaining lifespan for one or more articles of electrical equipment 20, and/or prioritize maintenance (e.g., repair or replacement) of articles of electrical equipment. In addition, stream analytics service 68F may generate output for communicating to cable accessories 34 (e.g., via notification service 68E) or computing devices 60 (e.g., via notification service 68G or record management and reporting service 68G).

In this way, analytics service 68F processes inbound streams of events, e.g., hundreds, thousands, or more events, from monitoring devices 33 within environments 8 to apply historical data and models 74C to compute assertions, such as identified anomalies or predicted occurrences of imminent failure events based on conditions sensed by the sensors of the monitoring devices 33. Stream analytics service 68F may publish the assertions to notification service 68F and/or record management by service bus 70 for output to any of clients 63.

In this way, analytics service 68F may be configured as an active electrical equipment management system that predicts failure events (e.g., potentially imminent failures or failures likely to occur within a threshold amount of time) and provides real-time alerting and reporting. In addition, analytics service 68F may be a decision support system that provides techniques for processing inbound streams of event data to generate assertions in the form of statistics, conclusions, and/or recommendations on electrical equipment 20 for utilities, workers, and other remote users. For instance, analytics service 68F may apply historical data and models 74C to determine a probability of failure of one or more articles of electrical equipment 20 (e.g., cable accessories 34), prioritize repair and/or replacement of the article of electrical equipment, etc. Hence, analytics service 68F may maintain or otherwise use one or more models that provide risk metrics to predict failure events.

In some examples, analytics service 68F may generate user interfaces based on processing data stored by EEMS 6 to provide actionable data to any of clients 63. For example, analytics service 68F may generate dashboards, alert notifications, reports and the like for output at any of clients 63. Such data may provide various insights regarding baseline (e.g. normal) operation across environments 8 or electrical equipment 20 (e.g., cable accessories 34), identifications of any anomalous characteristics of electrical equipment 20 that may potentially cause a failure of at least a portion of the power grid within an environment 8, and the like.

EEMS 6 may apply analytics to predict the likelihood of a failure event. Although other technologies can be used, in one example implementation, analytics service 68F utilizes machine learning when operating on event streams so as to perform real-time analytics. That is, analytics service 68F may include executable code generated by application of machine learning to training data of event streams and known failure events to detect patterns. The executable code may take the form of software instructions or rule sets and is generally referred to as a model that can subsequently be applied to event streams 69 for detecting similar patterns and predicting upcoming events. For example, analytics service 68F may determine a status or health (e.g., predicted remaining lifespan) of the respective article of equipment 20 (e.g., cable accessory 34A) or predict whether/when the respective article of electrical equipment 20 will experience a failure event. That is, EEMS 6 may determine the likelihood or probability of a failure event based on application historical data and models 74C to event data received from electrical equipment 20. For example, EEMS 6 may apply historical data and models 74C to event data from monitoring devices 33 in order to compute assertions, such as anomalies or predicted occurrences of imminent failure events based on sensor data, environmental conditions, and/or other event data corresponding to electrical equipment 20 monitored by monitoring devices 33.

EEMS 6 may apply analytics to identify relationships or correlations between data from computing device 52 of cross-section sensing module 80 (e.g., image data indicative of layers of electrical cables 32 cut by cable preparation device 50), sensed data from sensors of monitoring devices 33, monitoring electrical equipment 20, environmental conditions of environments in which electrical equipment 20 is located, a geographic region in which electrical equipment 20 is located, a type of electrical equipment 20, a manufacturer and/or installer of electrical equipment, among other factors. EEMS 6 may determine, based on the data acquired across populations of electrical equipment 20, conditions, possibly within a certain environment or geographic region, lead to, or are predicted to lead to, unusually high occurrences of failure events. EEMS 6 may generate alert data based on the analysis of the event data and transmit the alert data to computing devices 16 and/or monitoring device 33. Hence, according to aspects of this disclosure, EEMS 6 may determine event data of monitoring devices 33, generate status indications, determine performance analytics, and/or perform prospective/preemptive actions based on a likelihood of a failure event (e.g., scheduling maintenance or replacement).

Analytics service 68F may, in some example, generate separate models for different environments, geographic areas, types of electrical equipment, or combinations thereof. Analytics service 68F may update the models based on event data received from monitoring devices 33. For example, analytics service 68F may update the models for a particular geographic area, a particular type of electrical equipment, a particular environment, or combinations thereof based on event data received from monitoring devices 33. Alternatively, or in addition, analytics service 68F may communicate all or portions of the generated code and/or the machine learning models to cross-section sensing module 80, computing device 52, and/or computing device 42 for execution thereon so as to provide local alerting in near-real time.

Example machine learning techniques that may be employed to generate models 74C can include various learning styles, such as supervised learning, unsupervised learning, and semi-supervised learning. Example types of algorithms include Bayesian algorithms, Clustering algorithms, decision-tree algorithms, regularization algorithms, regression algorithms, instance-based algorithms, artificial neural network algorithms, deep learning algorithms, dimensionality reduction algorithms and the like. Various examples of specific algorithms include Bayesian Linear Regression, Boosted Decision Tree Regression, and Neural Network Regression, Back Propagation Neural Networks, the Apriori algorithm, K-Means Clustering, k-Nearest Neighbour (kNN), Learning Vector Quantization (LUQ), Self-Organizing Map (SOM), Locally Weighted Learning (LWL), Ridge Regression, Least Absolute Shrinkage and Selection Operator (LASSO), Elastic Net, and Least-Angle Regression (LARS), Principal Component Analysis (PCA) and Principal Component Regression (PCR).

EEMS 6 may initially train models 74C based on a training set of event data and, in some examples, on data for corresponding failure events. As further example description, EEMS 6 may select a training set comprising a set of training instances, each training instance comprising an association between event data and a failure event. EEMS 6 may, for each training instance in the training set, modify, based on particular event data and a particular failure event of the training instance, one or more of models 74C to change a likelihood predicted by the models for the particular failure event in response to subsequent event data applied to the models 74C. In some examples, the training instances may be based on real-time or periodic data generated while EEMS 6 managing data for one or more articles of electrical equipment and/or work environments. As such, one or more training instances of the set of training instances may be generated from use of one or more articles of electrical equipment 20 after EEMS 6 performs operations relating to the detection or prediction of a failure event for an article of electrical equipment 20.

By training a model based on the training set, analytics service 68F may apply the model to the event data and generate higher probabilities or scores for failure events that correspond to training feature sets that are more similar to the particular feature set. In the same way, analytics service 68F may apply the model the event data and generate lower probabilities or scores for failure events that correspond to training feature sets that are less similar to the particular feature set. Accordingly, analytics service 68F may train one or more models 74C, receive event data from one or more monitoring devices 33 monitoring respective articles of electrical equipment 20, and output one or more probabilities or scores that indicate likelihoods of failure events based on the received event data vector.

Analytics service 68F may train one or models 74C based on cable preparation data (e.g., image data of electrical cables 32, dimensions of cuts associated with respective layers of electrical cables 32, types of electrical cables 32, cutting techniques for cutting layers of electrical cables 32, etc.) for a plurality of electrical cables 32 and known failure events of electrical cables 32. For example, analytics service 68F may determine, based on the training data, a relationship between life expectancy of an electrical cable and different types of cuts or different cutting dimensions.

In some examples, analytics service 68F trains the one or more models 74C based on failure events for articles of electrical equipment 20 and/or work environment having similar characteristics (e.g., of a same type). The "same type" may refer to identical but separate instances of articles of electrical equipment, or may not refer to identical instances of electrical equipment. For instance, although not identical, a same type may refer to articles of electrical equipment in a same class or category of electrical equipment, same model of electrical equipment, or same set of one or more shared functional or physical characteristics, to name only a few examples. Similarly, a same type of environment may refer to identical but separate instances of work environment types. In other examples, although not identical, a same type may refer to an environment in a same class or category of environments, such as "below ground electrical cables", "underwater electrical cables", a particular US state, climate, among others.

In some examples, analytics service 68F may predict a failure event based at least in part on application of models 74C to event data 69, such as cable preparation data generated by cross-section sensing module 80. For example, analytics service 68F may apply one or more models 74C to cable preparation data indicating the actual cutting dimensions (e.g., depth and/or cutback length) of various layers of electrical cable 32A to determine a probability that electrical cable 32A will fail.

According to aspects of this disclosure, EEMS 6 may output information to cross-section sensing module 80 to enable cable preparation device 50 to prepare electrical cables 32 for installation to a power grid. For example, EEMS 6 may output target cutting dimensions to cross-section sensing module 80.

EEMS 6 may perform the techniques disclosed above with reference to FIG. 1 and computing devices 42, 52, 53. For examples, EEMS 6 may determine whether a component (e.g., a cutting tool) of cable preparation device 50 should be serviced. In some examples, EEMS 6 schedules maintenance (e.g., repair or replacement) operations of electrical equipment 20 (e.g., cable preparation device 50) based on event data. In some examples, analytics service 68F may automatically order replacement electrical equipment 20 based on one or more models 74C.

In some examples, analytics service 68F may output a notification (e.g., to computing devices 16) in response to determining an electrical cable is likely to fail, such as a notification to re-cut the layers of an electrical cable or apply different cutting techniques. For example, analytics service 68F may output a notification to one or more computing devices 16 via notification service 68E.

Again, EEMS 6 may determine the above-described performance characteristics and/or generate the alert data based on application of the event data to one or more models 74C. However, while the determinations are described with respect to EEMS 6, as described in greater detail herein, one or more other computing devices, such cross-section sensing module 80, computing device 52, computing device 53, and/or computing device 42 may be configured to perform all or a subset of such functionality.

Record management and reporting service 68G processes and responds to messages and queries received from computing devices 60 via interface layer 64. For example, record management and reporting service 68G may receive requests from client computing devices for event data related to individual articles electrical equipment 20, groups of articles of electrical equipment (e.g., types of articles), geographic regions of environments 8 or environments 8 as a whole. In response, record management and reporting service 68G accesses event data based on the request. Upon retrieving the event data, record management and reporting service 68G constructs an output response to the client application that initially requested the data. In some examples, the data may be included in a document, such as an HTML document, or the data may be encoded in a JSON format or presented by a dashboard application executing on the requesting client computing device. For instance, as further described in this disclosure, example user interfaces that include the event data are depicted in the figures.

As additional examples, record management and reporting service 68G may receive requests to find, analyze, and correlate event data (e.g., event data for one or more monitoring devices 33 monitoring respective articles of electrical equipment 20). For instance, record management and reporting service 68G may receive a query request from a client application for event data 74B over a historical time-frame, such as a user can view event data over a period of time and/or a computing device can analyze the event data over the period of time.

In example implementations, services 68 may also include security service 68H that authenticate and authorize users and requests with EEMS 6. Security service 68H may provide audit and logging functionality for operations performed at EEMS 6.

Figure 3:
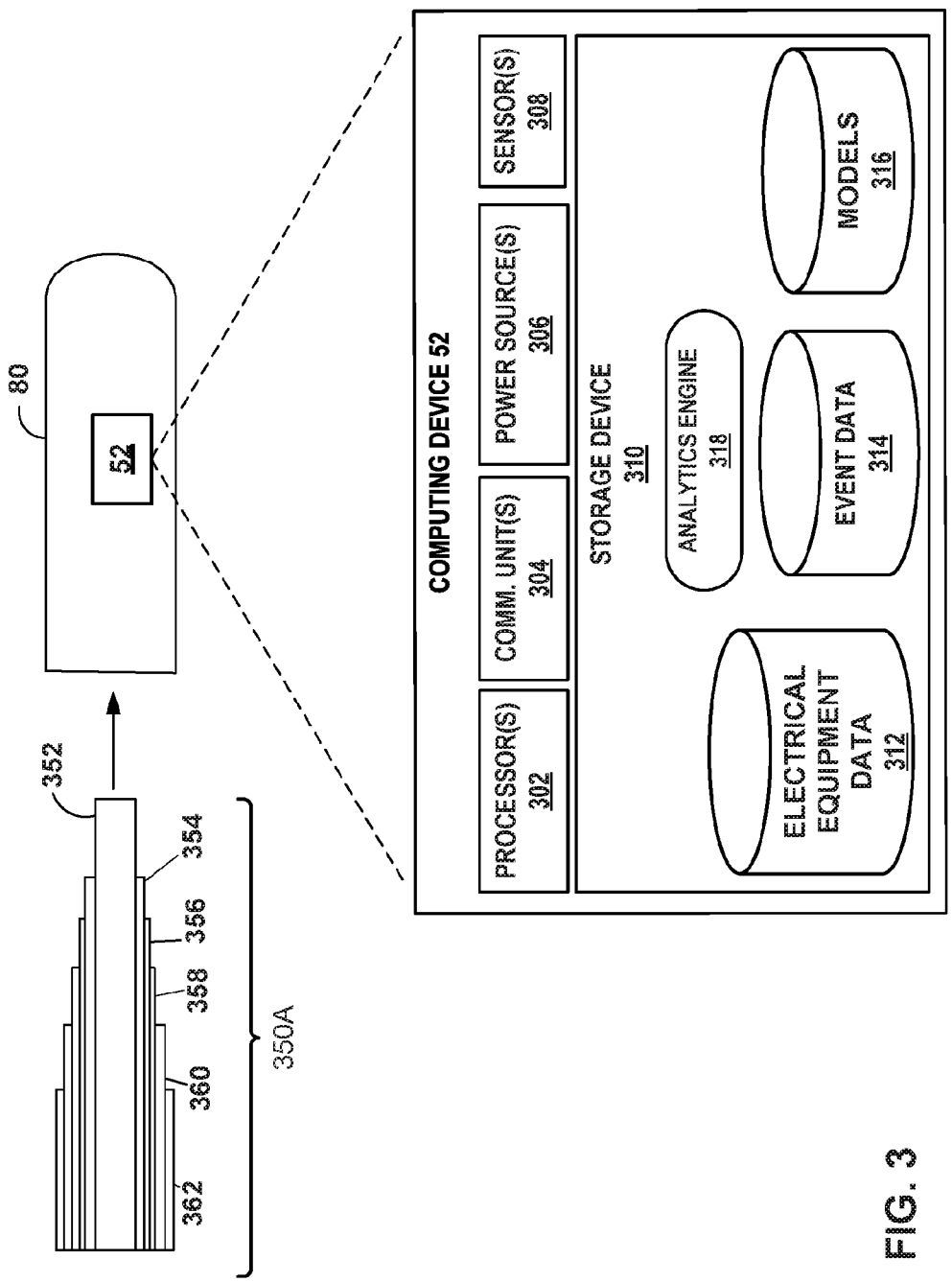
FIG. 3 is a conceptual diagram of an example cross-section sensing module and an electrical cable, in accordance with various techniques of this disclosure.

FIG. 3 is a conceptual diagram of a cross-section sensing module 80 configured to image the end-face of an electrical cable 350 for installation to an electrical grid, in accordance with various techniques of this disclosure. Electrical cable 350 may be an example of electrical cables 32 of FIG. 1.

In the example of FIG. 3, electrical cable 350 includes a plurality of concentric (e.g., cylindrical) layers, such as central conductor 352, conductor screen 354, insulation 356, insulation screen 358, shield 360 (also referred to as sheath 360), and jacket 362. However, in some examples, electrical cables 350 may include more or fewer layers. It should be understood that the layers of cables 350 are not necessarily drawn to scale. Electrical cables 350 may be configured for AC and/or DC power transmission having voltages of 11 kV, 33 kV, 66 kV, 360 kV, or other suitable voltages.

Central conductor 352 includes a conductive material, such as copper or aluminum. In some examples, central conductor 352 includes a single solid conductor or a plurality of stranded conductors. A diameter or thickness of the central conductor 352 is based on the current that electrical cables 350 is designed to transmit or conduct. In other words, the cross-sectional area of central conductor 352 is based on the current that electrical cables 350 are designed to transmit. For example, central conductor 352 may be configured to transmit currents of 1,000 amperes or more.

Conductor screen 354 may include a semi-conductive polymer, such as carbon black loaded polymer. The semi-conductive polymer may have a bulk resistivity in a range from approximately 5 ohm-cm to approximately 100 ohm-cm. Conductor screen 354 may be physically and electrically coupled to central conductor 352. In the example of FIG. 3, conductor screen 354 is disposed between central conductor 352 and insulation 356. Conductor screen 354 may provide a continuous conductive surface around the exterior of central conductor 352, which may reduce or eliminate sparking that might otherwise be created by central conductor 352.

In some examples, insulation 356 includes polyethylene, such as a cross-linked polyethylene (which may be abbreviated as PEX, XPE, or XLPE) or an ethylene propylene rubber (which may be abbreviated as EPR) or High Performance Thermoplastic Elastomer (HPTE). A diameter or thickness of the insulation 356 is based on the voltage that electrical cables 350 is designed to transmit or conduct.

Insulation screen 358 may include a semi-conductive polymer similar to conductor screen 354. In the example of FIG. 3, insulation screen 358 is disposed between insulation 356 and shield 360. Insulation screen 358 may be coupled to insulation 356. In some examples, insulation screen 358 is electrically coupled to shield 360

Shield 360 may include a conductive material, such as a metal foil or film or wires. In some examples, shield 360 may be referred to as a "earth ground conductor."

Jacket 362, also referred to as an "oversheath," is an outer layer of electrical cables 350. Jacket 362 may be a plastic or rubber polymer, such as polyvinyl chloride (PVC), polyethylene (PE), or ethylene propylene diene monomer (EPDM).

Electrical cables 350 may include additional layers, such as a swellable or water blocking material placed within the conductor strands (e.g., a strand fill) or between various layers within electrical cables 350.

According to aspects of this disclosure, cross-section sensing module 80 includes computing device 52. In some examples, computing device 52 includes at least one processor 302, a communication unit 304, a power source 306, one or more sensors 308, and a storage device 310. In other example, computing device 52 may include fewer or additional components.

Power sources 306 is configured to provide power to components shown in computing device 52. In some examples, power sources 306 include a primary power source to provide electrical power and a secondary, backup power source to provide electrical power if the primary power source is unavailable (e.g., fails or is otherwise not providing power). In some examples, power source 306 includes a battery, such as a Lithium Ion battery.

One or more processors 302 may implement functionality and/or execute instructions within computing device 52. For example, processors 302 may receive and execute instructions stored by storage device 310. These instructions executed by processors 302 may cause computing device 52 to store and/or modify information, within storage devices 310 during program execution. Processors 302 may execute instructions of components, analytics engine 318, to perform one or more operations in accordance with techniques of this disclosure. That is, analytics engine 318 may be operable by processor 302 to perform various functions described herein.

One or more communication units 304 of computing device 52 may communicate with external devices by transmitting and/or receiving data. For example, computing device 52 may use communication units 304 to transmit and/or receive radio signals on a radio network such as a cellular radio network. Examples of communication units 304 include a network interface card (e.g. such as an Ethernet card), an optical transceiver, a radio frequency transceiver, a GPS receiver, or any other type of device that can send and/or receive information. Other examples of communication units 304 may include Bluetooth®, GPS, cellular (e.g., 3G, 4G), LPWAN, and Wi-Fi® radios. As another example, communications unit 304 may communicate with external devices by transmitting and/or receiving data via wired communication.

Computing device 52 may include one or more imaging devices, such as a camera or barcode scanner. For example, computing device 52 may include a plurality of cameras configured to take images of electrical cable 350 during and/or after the layers of electrical cable 350 are cut.

One or more storage devices 310 may store information for processing by processors 302. In some examples, storage device 310 is a temporary memory, meaning that a primary purpose of storage device 310 is not long-term storage. Storage device 310 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage device 310 may, in some examples, also include one or more computer-readable storage media. Storage device 310 may be configured to store larger amounts of information than volatile memory. Storage device 310 may further be configured for long-term storage of information as non-volatile memory space and retain information after activate/off cycles. Examples of non-volatile memories include, flash memories, or forms of electrically programmable memories (EPROM) or electrically erasable and programmable (EEPROM) memories. Storage device 310 may store program instructions and/or data associated with components such as analytics engine 318.

Storage devices 310 may include electrical equipment data repository 312, event data repository 314, models repository 316, and analytics engine 318. Data repositories 312, 314, and 316 may include relational databases, multi-dimensional databases, maps, and hash tables, or any data structure that stores data. In some examples, electrical equipment data repository 312 may be similar to, and may include data similar to, electrical equipment data repository 74A of FIG. 2. Likewise, event data repository 314 may be similar to, and may include data similar to, event data 74B as described in FIG. 2.

According to aspects of this disclosure, analytics engine 318 may be operable by one or more processors 302 to all or a subset of the functions of computing devices 42 and 52 described with reference to FIG. 1 and EEMS 6 described with reference to FIGS. 1 and 2.

Figure 4:
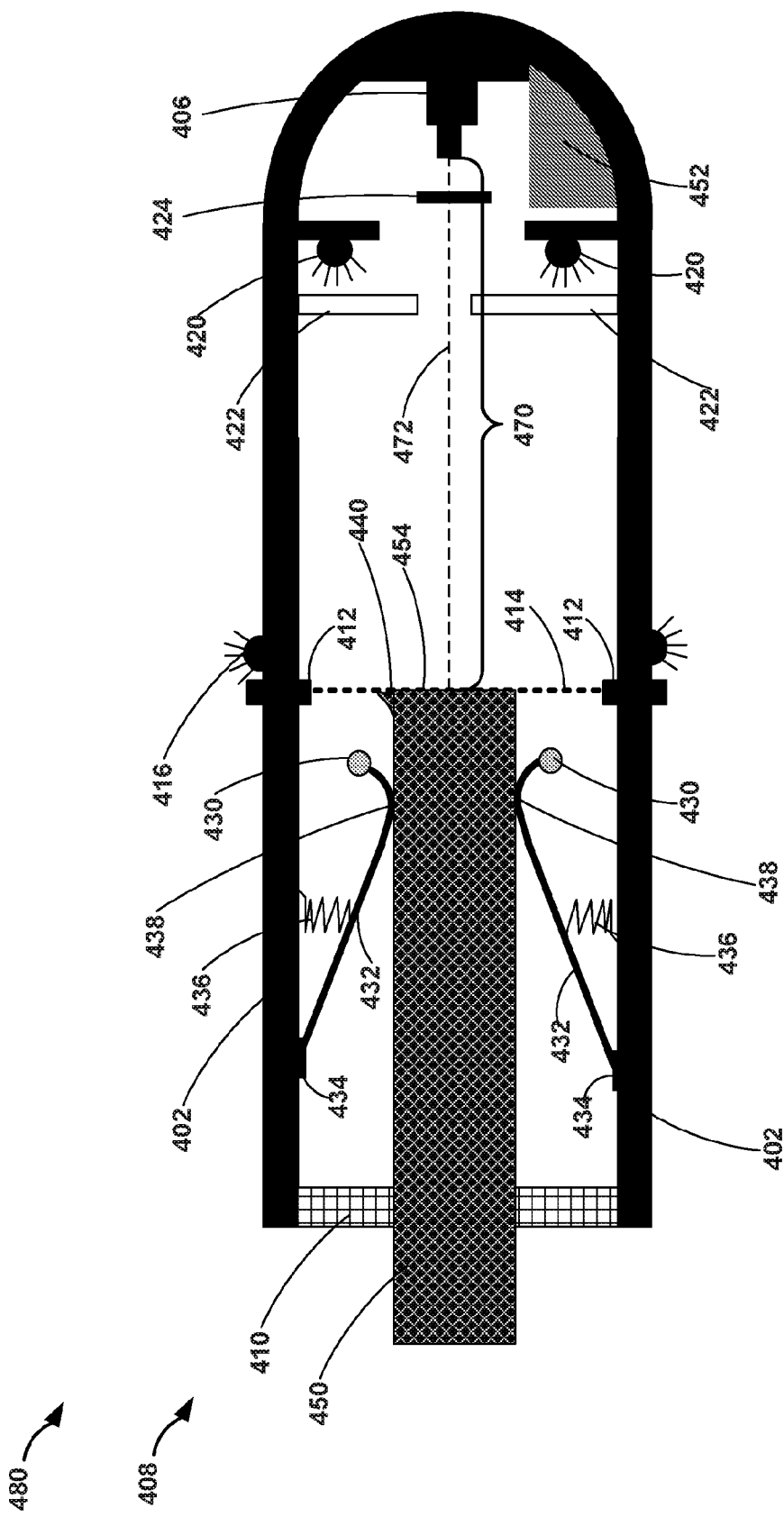
FIG. 4 is a cross-sectional schematic diagram illustrating an example cross-section sensing module configured to image the end-face of an electrical cable, in accordance with various techniques of this disclosure.

FIG. 4 is a cross-sectional schematic diagram illustrating an example cross-section sensing module 480 configured to image the end-face of an electrical cable 450, in accordance with various techniques of this disclosure. Cross-section sensing module 480 may be an example of cross-section sensing module 80. Electrical cable 450 may be an example of electrical cables 32 of FIG. 1.

In the example of FIG. 4, cross-section sensing module 480 includes housing 402 that encloses a volume including a camera 406 and an opening 408. Housing 402 may be made of any type of material appropriate for providing structural support for components within the enclosed volume. Housing 402 may be opaque, for example, to block ambient light from entering the volume. In the example shown, housing 402 includes opening 408 opposite an enclosed end to which camera 406 is attached within the housing. In the example shown, an end of cable 450 including end-face 454 may be inserted into opening. Camera 406 is within housing 402 facing opening 408 and end-face 454. In the examples shown, camera 406 has optical axis 472 parallel with a long axis of housing 402, as illustrated in FIG. 4.

Opening 408 may be large enough to accept electrical cable 450, and may be larger than the diameter or largest cross-sectional dimension of electrical cable 450. In the example shown, opening 408 includes flexible covering 410. In some examples, flexible covering 410 covers the entirety of opening 408 and flexibly opens to accept electrical cable 450 being inserted into housing 402. In some examples, flexible covering may be a brush comprising a plurality of bristles that flex so as to allow electrical cable 450 to pass opening 408 and remain in contact with the outer surface of electrical cable 450, thereby reducing or blocking ambient light from entering housing 402. In some examples, flexible covering 410 may remove debris from electrical cable 450, for example, dust, debris, etc., may be brushed off or retained by flexible covering 410 as electrical cable 450 is inserted and traverses axially towards camera 406.

In some examples, flexible covering 410 may be white or light in color such that an image taken of end-face 454 of cable 450 when inserted into housing 402 may have contrast indicating the outside diameter of electrical cable 450, for example, the jacket 362 or insulation screen 358 of electrical cable 350. In other examples, flexible covering 410 may be any other color or reflectivity configured to provide contrast in an image of end-face 454 with the outside diameter of electrical cable 450.

In some examples, cross-section sensing module 480 includes computing device 452. Computing device 452 may be an example of computing device 52 of FIGS. 1-3. Computing device 452 may control camera 406 to capture images, store images, process images and other data or information, and transfer images via wired or wireless communications. Computing device may control and/or receive data and/or images from other components of cross-section sensing module 480, for example, sensors 412, indicators 416, camera 406, and light sources 420. In some examples, computing device 452 may receive an image captured by camera 406 and perform image processing to determine cable construction parameters. For example, computing device 452 may determine the number of conductor strands in an electrical cable, the arrangement of the conductor strands (e.g. stranding), the gauge of the conductor strands (e.g. the dimensions of the conductor strands), the number of shield wires, the shape of the shield wires (e.g. circular and/or flat), the gauge (e.g. dimensions) of the shield wires, the color and gray level of insulation, and the like.

In the example shown, cross-section sensing module 480 includes one or more sensors 412 configured to determine that end-face 454 is a predetermined distance from camera 456. For example, sensors 412 may be optical sensors that determine when end-face 454 passes or "breaks" plane 414. In some examples, the predetermined distance is imaging distance 470 optimal for capturing an in-focus image of end-face 454 such that layer materials, thicknesses, and other parameters of cable 450 may be determined based on an image of end-face 454. In some examples, when a user electrical cable 450 into cross-section sensing module 480, computing device 452 may automatically cause camera 406 to capture one or more images of end-face 454 upon sensors 412 detecting or determining that end-face 454 has "broken" plane 414 and is at the predetermined distance.

Cross-section sensing module 480 includes one or more light sources 420. In some examples, light sources 420 may be dome light sources, and in other examples light sources 420 may be a ring of LEDs or a combination of a ring of LEDs and a diffuser between the LEDs and end-face 454. In the example shown, light sources 420 are configured to illuminate end-face 454.

Cross-section sensing module 480 also includes one or more transparent protectors 422. Transparent protectors 422 may be configured to prevent electrical cable 450 from reaching or damaging camera 406. Transparent protectors 422 may have a conical shape, or an annular shape. In some examples, transparent protectors 422 may diffusely transmit light. For example, transparent protectors 422 may be placed between light sources 420 and end-face 454 and diffusely transmit, e.g. transmit and scatter, light from light sources 420 so as to diffusely illuminate end-face 454. In some examples, the diffuse illumination of end-face 454 may reduce or eliminate undesired reflections such as specular reflections or glint. In some examples, light sources 420 may be placed along an edge of transparent protectors 422 and transparent protectors 422 may be configured to diffuse and emit light that is injected into transparent protectors by light sources 420 towards end-face 454. For example, transparent protectors may be edge-light light guides and/or illuminators.

Cross-section sensing module 480 also includes protector 424. In the example shown, protector 424 may be configured to prevent an object from reaching or damaging camera 406, for example, an electrical cable of sufficiently small diameter, or any other object. In the example shown, protector 424 is transparent, e.g. to allow camera 406 a view of a scene on the opposite side of protector 424 from camera 406.

Cross-section sensing module 480 also includes one or more markers 430. In the examples shown, markers 430 include, or are a part of, a predetermined pattern having predetermined positions. For example, when electrical cable 450 is inserted into cross-section sensing module 480, markers 430 may be positioned a known distance from the outer surface of electrical cable 450, and may be included in an image captured of end-face 454 by camera 406. In some examples, markers 430 may have a known radial distance in an image captured by camera 406, for example, by having a precisely predetermined axial position or distance with respect to camera 406. In the example shown, cross-section sensing module 480 includes one or more arms 432. In the example shown, arms 432 are attached to hinges 434. In some examples, hinges 434 may be leaf springs. In the examples shown, hinges 434 are attached to an inner surface of housing 402 and an end of arms 432, and allow arms 432 to move radially within the cavity of housing 402. In the example shown, springs 436 may be attached to an inner surface of housing 402 and arms 432, and function to force arms 432 away from the inner surface of housing 402. In the example shown, markers 430 are attached to an end of arms 432 opposite the end of arms 432 attached to hinges 434, and arms 432 are bent or curved with a predetermined curvature and distance.

For example, when electrical cable 450 is inserted into opening 408 and traverses axially within housing 402 towards camera 406, electrical cable 450 may separate one or more arms 432 towards the inner surface of housing 402. Springs 436 force arms 432 away from the inner surface of housing 402 ensuring that arms 432 are in contact with an outer surface of electrical cable 450. In the examples shown, electrical cable 450 has a burr 440, e.g. a non-uniformity, or distortion, near end-face 454. In some examples, burr 440 may originate due to cutting electrical cable 450. In some examples, burr 440 may prevent an image captured by camera 406 from accurately determining the diameter of the outer layer of end-face 454 or electrical cable 450, for example, jacket 362, insulation screen 358, etc. In the example shown, markers 430 extend radially beyond burr 440 and are visible to camera 406, and are at a known, predetermined distance from contact points 438. As such, the outer diameter of electrical cable 450 may be determined from an image of end-face 454 captured by camera 406 and including markers 430. In some examples, sensors 412, or other sensors located at other positions within housing 402, may be configured to determine the diameter of the outer layer of end-face 454 or electrical cable 450, for example by optically ranging the radial location of the outer surface of end-face 454 or electrical cable 450. In another example, hinges 434 may be configured to determine the diameter of the outer layer and/or surface of end-face 454 or electrical cable 450, for example, by including an encoder or other means for measuring the angle of arms 432 with respect to the inner surface of housing 402. In another example, cross-section sensing module 80 may include other mechanical arms configured to contact the outer surface of end-face 454 or electrical cable 450 and determine the diameter of the outer surface of end-face 454 or electrical cable 450. In still another example, cross-section sensing module 80 may include one or more cameras, sensors, and light sources for determining the diameter of the outer surface of end-face 454 or electrical cable 450 via depth sensors, stereo triangulation, sheet of light triangulation, structured light, time-of-flight, interferometry, coded aperture, laser rangefinding, lidar, or by any other means.

Figure 5:
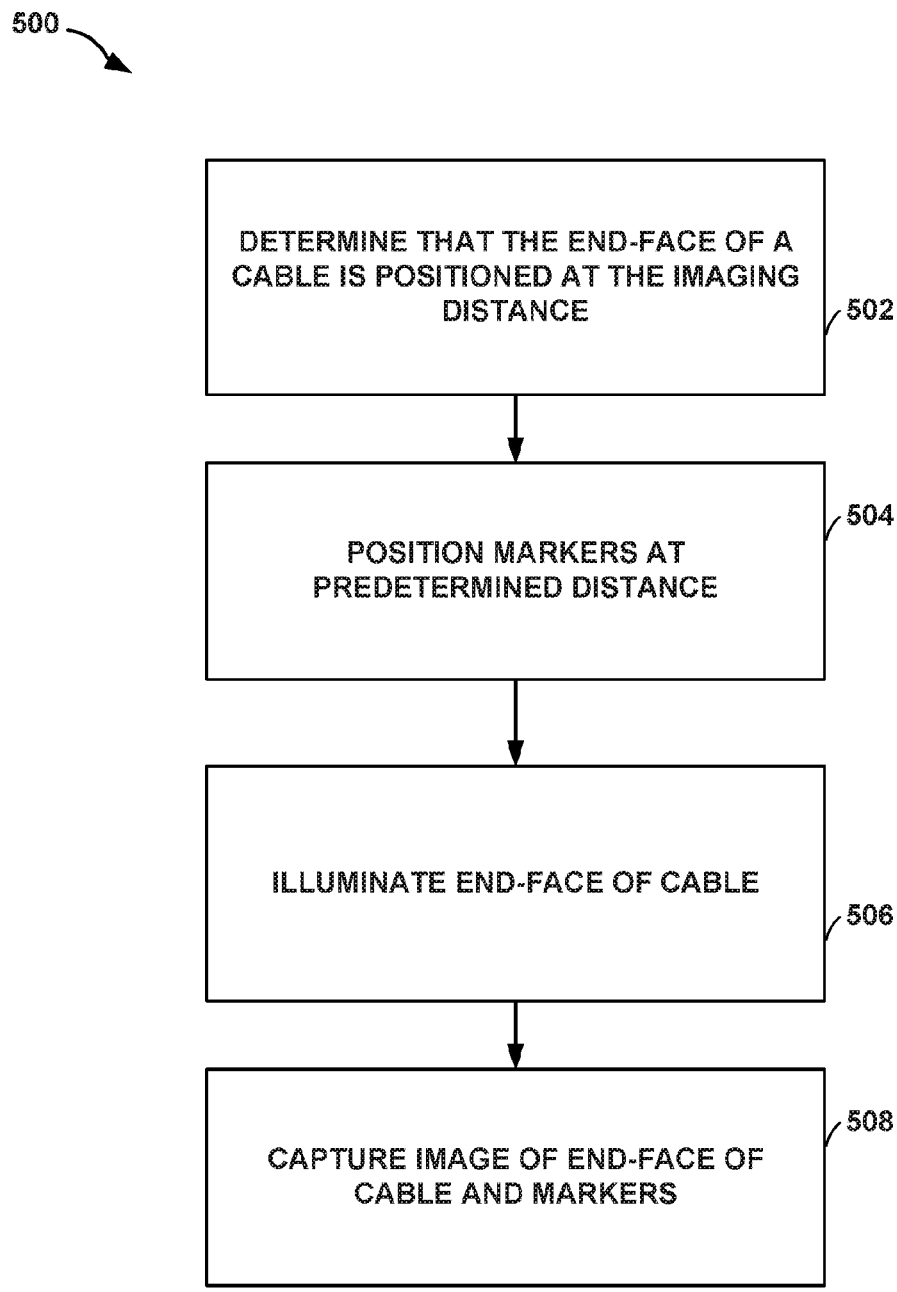
FIG. 5 is a flow chart illustrating example operations performed by a cross-section sensing module configured to image electrical cables, in accordance with various techniques of this disclosure.

FIG. 5 is a flow chart illustrating example operations performed by cross-section sensing module 80 and/or 480 configured to image electrical cables, in accordance with various techniques of this disclosure. FIG. 5 is described with reference to cross-section sensing module 80 and/or 480, and computing device 52, of FIGS. 1 and 4. However, the operations of FIG. 5 may be performed by other cable preparation devices or computing devices.

In some examples, it may be determined that the end-face of an electrical cable is at an imaging distance 470 from a camera (502). For example, and in reference to FIG. 4, as a user inserts cable 450 into cross-section sensing module 480 through opening 408, electrical cable 450 traverses axially within housing 402 towards camera 406. When end-face 454 reaches plane 414, sensors 412 detect or determine that all or a portion of end-face 454 is positioned at plane 414. In some examples, sensors 412 may be in communication with computing device 452 or may be controlled by computing device 452, which determines that all or a portion of end-face 454 is positioned at the plane 414. In some examples, plane 414 is at a predetermined imaging distance 470, for example, at a distance at which camera 406 can focus and have appreciable depth of focus, or otherwise has a desired minimum level of optical performance.

In the example shown, position markers may be located at a predetermined distance (504). For example, and in reference to FIG. 4, markers 430 may be attached to arms 432, which in turn are attached to housing 402 at hinges 434. Both the axial and radial positions of markers 430 may be predetermined, for example, by attachment to arms 432 having a predetermined shape, length, and attachment position of hinges 434 to housing 402. Further, when electrical cable 450 is inserted into cross-section sensing module 480, springs 436 force arms 432 to be in contact with an outside surface of electrical cable 450, for example, at contact points 438. In some examples, markers 430 are at a predetermined axial distance from camera 406, and the radial position of markers 430 may then be calculated in an image captured by camera 406 for any radial position of marker 430, for example, by simple geometry. In some examples, the radial position of markers 430 may be calibrated at all radial positions.

In the example shown, the end-face of an electrical cable may be illuminated (506). For example, and in reference to FIG. 4, when computing device 452 determines that all or a portion of end-face 454 is positioned at an imaging distance 470, e.g. at the plane 414, computing device 452 may cause light sources 420 to turn on, to strobe, to flash, etc. In some examples, light sources 420 may be configured to illuminate end-face 454 through diffusers, e.g. transparent protectors 422 which may diffusely transmit light. In some examples, light sources 420 may be broadband light sources. In some examples, a bandpass filter may be placed between light sources 420 and end-face 454, between end-face 454 and camera 406, or any combination thereof. In some examples, light sources 420 may be narrowband sources, for example, LEDs of a particular color, or lasers.

In the example shown, an image of the end-face of an electrical cable and position markers may be captured (508). For example, and with reference to FIG. 4, computing device 452 may cause camera to capture an image of end-face 454 and markers 430. For example, as a user inserts electrical cable 450 through opening 408 and cable 450 traverses axially towards camera 406, the electrical cable 450 may contact arms 432 and push arms 432 radially outwards towards the inner surface of housing 402. Springs 436 force arms 432 to be in contact with an outside surface of electrical cable 450. As electrical cable 450 traverses axially towards camera 450, end-face 454 may reach plane 414 at an imaging distance 470 from camera 406. Sensors 412 may detect that all or a portion of end-face 454 is at the imaging distance 470, and computing device 452 may determine, e.g. via communication with sensors 412, that end-face 454 is at the imaging distance 470. Computing device 452 may cause light sources 420 to turn on, strobe, etc., thereby illuminating end-face 454, and illuminating markers 430. At or near the same time, computing device may cause camera 406 to capture an image of end-face 454 at the imaging position and markers 430. In some examples, computing device 452 may cause an indicator to turn on, indicating that an image of end-face 454 has been captured, e.g. by flashing or turning on indicators 416.

Figure 6:
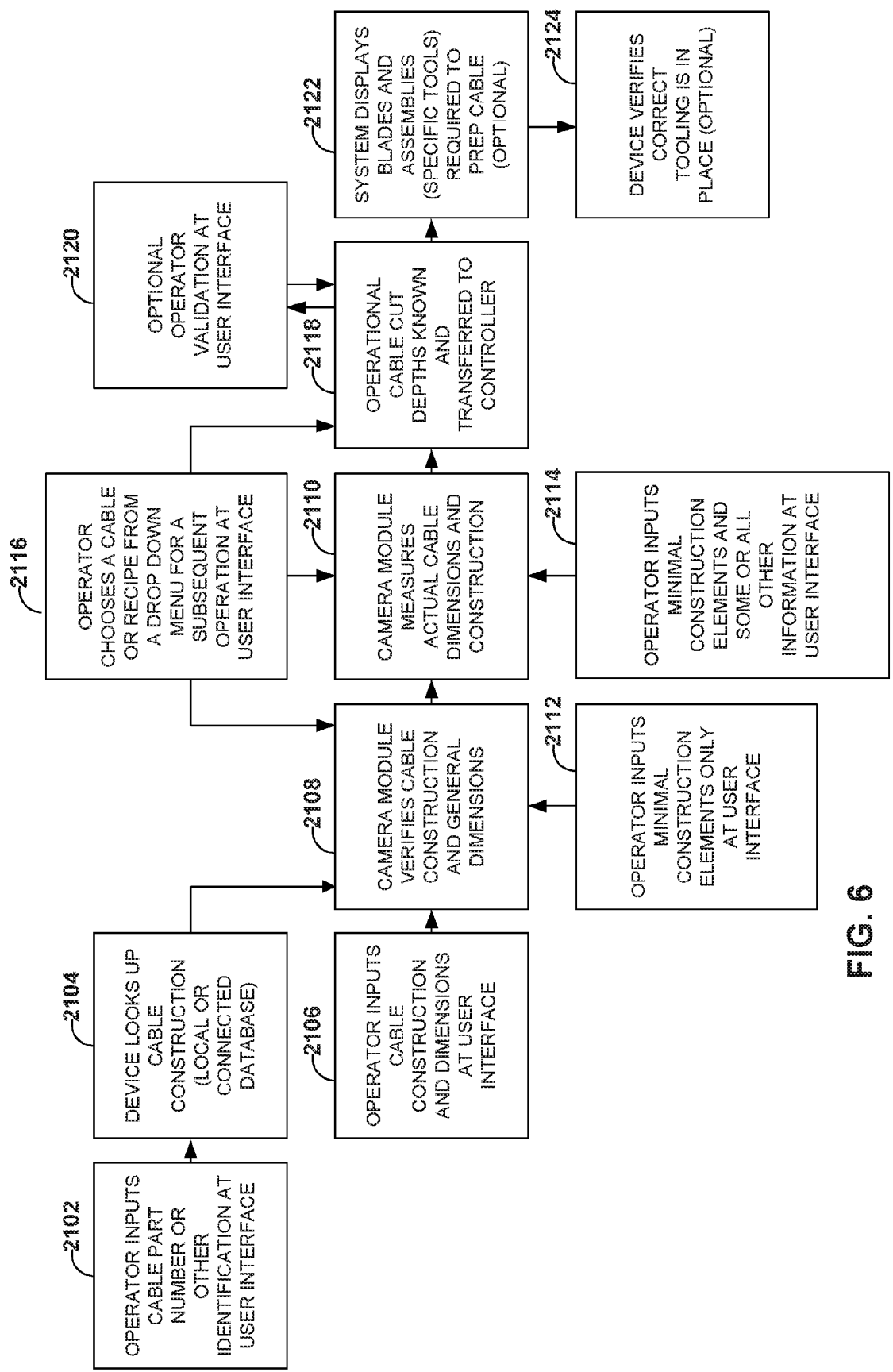
FIG. 6 is a flow chart illustrating example user input work flows for determining parameters of a cable preparation system for properly cutting a cable.

As discussed above with respect to FIG. 1, a user (for example, worker 40) may input, into a cable preparation system (e.g. system 2), cable preparation system data to determine parameters of a cable preparation system for properly cutting a cable. FIG. 6 is a flow chart illustrating example user input work flows for determining parameters of the cable preparation system for properly cutting a cable. In some examples, an operator (user) may input a cable part number or other identification information at a user interface (2102). The cable preparation system, based on the inputted data, may look-up cable construction information (2104). Alternatively, the operator may input cable construction information and/or dimensions at the user interface (2106). In some examples, a camera or other component of cable preparation system may verify the inputted and/or determined data, such as cable construction (2108) or cable dimensions (2110). For example, a camera or laser measuring device may verify a diameter of the cable. Alternatively, an operator may input minimal cable construction information only (2112), or minimal cable construction information and some additional information (2114), at the user interface and the cable preparation system, e.g., via a camera or other component, may verify cable information or determine other missing information. Additionally, or alternatively, the operator may select a cable or a recipe from a drop down menu or the like (2116). Subsequently, the cable preparation system determines, based on the inputted and determined information, cable cut depths to a controller (2118), which the operator may validate in some example (2120). Then the cable preparation system may display to the operator the blades, rollers, or other tooling and/or setting required to properly cut the cable (2122). In some examples, the cable preparation system may be configured to verify the correct tooling is installed proper to cutting the cable (2124).

The following clauses illustrate example subject matter described herein.

Clause 1. A device comprising: a camera configured to capture at least one image an end-face of an electrical cable; a housing configured to position the end-face of the electrical cable substantially perpendicular to an optical axis of the camera and at an imaging distance from the camera; and at least one optical marker configured to indicate a diameter of the electrical cable.

Clause 2. The device of clause 1, further comprising: at least one sensor configured to determine when the end-face of the electrical cable is positioned at the imaging distance.

Clause 3. The device of clause 2, further comprising at least one computing device configured to: determine, based on a signal received from the at least one sensor, that the end-face of the electrical cable is positioned at the imaging distance; and cause, in response to determining that the end-face of the electrical cable is positioned at the imaging distance, the camera to capture at least one image of the end-face of the electrical cable and the at least one optical marker.

Clause 4. The device of clause 3, wherein the at least one computing device is further configured to: determine at least one layer dimension of the electrical cable based on the image.

Clause 5. The device of any of clauses 1-4, further comprising: at least one light source configured to illuminate the end-face of the electrical cable.

Clause 6. The device of clause 5, further comprising: a transparent protector configured to block the electrical cable from contacting the camera, the transparent protector being transparent to the illumination of the at least one light source.

Clause 7. The device of clause 6, wherein the illumination of the end-face of the electrical cable is diffuse.

Clause 8. The device of any of clauses 6-7, wherein the at least one light source includes a ring of light emitting diodes (LEDs) configured to emit light into the transparent protector, wherein the transparent protector is configured to diffuse the light towards the end-face of the electrical cable.

Clause 9. The device of any of clauses 6-7, wherein the housing is configured to surround the camera, the at least one optical marker, the at least one sensor, the at least one light source, and the transparent shield, wherein an end of the housing is configured to accept a portion of the electrical cable including the end-face.

Clause 10. The device of clause 9, wherein the end of the housing configured to accept a portion of the electrical cable including the end-face includes an ambient light blocker configured to reduce ambient light entering the housing.

Clause 11. The device of clause 10, wherein the ambient light blocker comprises a light-colored material configured to provide contrast in the image compared to an insulation screen layer of the electrical cable.

Clause 12. A system comprising: a cross-section sensing module comprising: a camera configured to capture at least one image an end-face of an electrical cable; a housing configured to position the end-face of the electrical cable substantially perpendicular to an optical axis of the camera and at an imaging distance from the camera; and at least one optical marker configured to indicate an external diameter of the electrical cable; an electrical cable preparation device configured to cut at least one layer of an electrical cable; and a computing device configured to receive the at least one image.

Clause 13. The device of clause 12, the cross-section sensing module further comprising: at least one sensor configured to determine when the end-face of the electrical cable is positioned at the imaging distance.

Clause 14. The device of clause 13, wherein the computing device is further configured to: cause the camera to capture at least one image of the end-face of the electrical cable and the at least one optical marker upon determination that the end-face of the electrical cable is positioned at the imaging distance by the sensor; determine the diameter of the electrical cable based on the image; and determine at least one layer dimension of the electrical cable based on the image.

Clause 15. The device of clause 12, the cross-section sensing module further comprising: at least one light source configured to illuminate the end-face of the electrical cable; and a transparent protector configured to block the electrical cable from contacting the camera, the transparent shield being transparent to the illumination of the at least one light source.

Clause 16. The device of clause 15, wherein the illumination of the end-face of the electrical cable is diffuse.

Clause 17. The device of any of clauses 15-16, wherein the housing is configured to surround the camera, the at least one optical marker, the at least one sensor, the at least one light source, and the transparent shield, wherein an end of the housing is configured to accept a portion of the electrical cable including the end-face.

Clause 18. The device of clause 17, wherein the end of the housing configured to accept a portion of the electrical cable including the end-face includes an ambient light blocker configured to reduce ambient light entering the housing.

Clause 19. The device of clause 18, wherein the ambient light blocker comprises a light-colored material configured to provide contrast in the image compared to an insulation screen layer of the electrical cable.

Clause 20. A method comprising: determining, by a processor, that an end-face of an electrical cable is positioned at an imaging distance from a camera; positioning, by one or more hinged member, at least one optical marker at a predetermined distance from an outside surface of the electrical cable; capturing, by a camera communicatively coupled to the processor, an image of the end-face of the electrical cable and the at least one optical marker automatically upon determination that the end-face of the electrical cable is positioned at the imaging distance; and determining, by the processor, at least one layer dimension of the electrical cable based on the image.

Clause 21. The method of claim 20, further comprising: determining, by the processor, a number of conductor strands, at least one strand gauge, an arrangement of conductor strands, a number of shield wires, a shape of shield wires, at least one shield wire dimension, a presence of a foil shield, and a color and gray level of insulation based on the image.

Clause 22. The method of clause 20, further comprising: illuminating, by at least one light source, the end-face of the electrical cable with diffuse illumination; and reducing, by an ambient light blocker, ambient illumination of the end-face of the electrical cable.

Clause 23. The method of any of clauses 20-22, further comprising: presenting, via a display of a user interface, information indicative of the at least one layer dimension.

Clause 24. A device comprising: a camera configured to capture at least one image of an end-face of an electrical cable; and a housing configured to position the end-face of the electrical cable substantially perpendicular to an optical axis of the camera and at an imaging distance from the camera, wherein image data based on the at least one image is indicative of at least one characteristic of the electrical cable.

Clause 25. The device of claim 24, further comprising a means for determining a diameter of the electrical cable.

Clause 26. The device of claim 25, wherein the means for determining a diameter of the electrical cable comprises an optical marker.

Clause 27. The device of claim 24, wherein the at least one image includes a predetermined pattern of light.

Clause 28. The device of claim 27, wherein the predetermined pattern of light indicates the depth of at least one layer of the electrical cable.

Various examples have been described. These and other examples are within the scope of the following claims.

What is claimed is:

1. A device comprising:
a camera configured to capture an image of an end-face of an electrical cable;

a housing configured to position the end-face of the electrical cable substantially perpendicular to an optical axis of the camera and at an imaging distance from the camera; and at least one optical marker configured to indicate a diameter of the electrical cable, wherein the image includes the at least one optical marker.

2. The device of claim 1, further comprising at least one sensor configured to determine when the end-face of the electrical cable is positioned at the imaging distance.

3. The device of claim 2, further comprising at least one computing device configured to:

determine, based on a signal received from the at least one sensor, that the end-face of the electrical cable is positioned at the imaging distance; and cause, in response to determining that the end-face of the electrical cable is positioned at the imaging distance, the camera to capture the image of the end-face of the electrical cable and the at least one optical marker.

4. The device of claim 3, wherein the at least one computing device is further configured to determine at least one layer dimension of the electrical cable based on the image.

5. The device of claim 2, further comprising at least one light source configured to illuminate the end-face of the electrical cable.

6. The device of claim 5, further comprising a transparent protector configured to block the electrical cable from contacting the camera.

7. The device of claim 6, wherein the at least one light source includes a ring of light emitting diodes (LEDs) configured to emit light into the transparent protector, wherein the transparent protector is configured to diffuse the light towards the end-face of the electrical cable.

8. The device of claim 6, wherein the housing is configured to surround the camera, the at least one optical marker, the at least one sensor, the at least one light source, and the transparent protector, wherein an end of the housing is configured to accept a portion of the electrical cable including the end-face.

9. The device of claim 8, wherein the end of the housing configured to accept a portion of the electrical cable including the end-face includes an ambient light blocker configured to reduce ambient light entering the housing.

10. The device of claim 9, wherein the ambient light blocker comprises a light-colored material configured to provide contrast in the image compared to an insulation screen layer of the electrical cable.

11. A system comprising:

a cross-section sensing module comprising:

a camera configured to capture an image of an end-face of an electrical cable;

a housing configured to position the end-face of the electrical cable substantially perpendicular to an optical axis of the camera and at an imaging distance from the camera; and at least one optical marker configured to indicate an external diameter of the electrical cable, wherein the image includes the at least one optical marker;

an electrical cable preparation device configured to cut at least one layer of an electrical cable; and a computing device configured to receive the image.

12. The system of claim 11, the cross-section sensing module further comprising at least one sensor configured to determine when the end-face of the electrical cable is positioned at the imaging distance.

13. The system of claim 12, wherein the computing device is further configured to:

cause the camera to capture the image of the end-face of the electrical cable and the at least one optical marker upon determination that the end-face of the electrical cable is positioned at the imaging distance by the sensor;

determine the diameter of the electrical cable based on the image; and determine at least one layer dimension of the electrical cable based on the image.

14. The system of claim 11, the cross-section sensing module further comprising:

at least one light source configured to illuminate the end-face of the electrical cable, wherein the illumination of the end-face of the electrical cable is diffuse; and a transparent protector configured to block the electrical cable from contacting the camera, the transparent protector being transparent to the illumination of the at least one light source.

15. The system of claim 14, wherein the housing is configured to surround the camera, the at least one optical marker, the at least one sensor, the at least one light source, and the transparent protector, wherein an end of the housing is configured to accept a portion of the electrical cable including the end-face.

16. The device of claim 15, wherein the end of the housing configured to accept a portion of the electrical cable including the end-face includes an ambient light blocker configured to reduce ambient light entering the housing, wherein the ambient light blocker comprises a light-colored material configured to provide contrast in the image compared to an insulation screen layer of the electrical cable.

17. A method comprising:

determining, by a processor, that an end-face of an electrical cable is positioned at an imaging distance from a camera;

positioning, by one or more hinged members, at least one optical marker at a predetermined distance from an outside surface of the electrical cable;

capturing, by a camera communicatively coupled to the processor, an image including the end-face of the electrical cable and the at least one optical marker automatically upon determination that the end-face of the electrical cable is positioned at the imaging distance; and determining, by the processor, at least one layer dimension of the electrical cable based on the image.

18. The method of claim 17, further comprising:

determining, by the processor, one or more of a number of conductor strands, at least one strand gauge, an arrangement of conductor strands, a number of shield wires, a shape of shield wires, at least one shield wire dimension, a presence of a foil shield, and a color and gray level of insulation based on the image.

19. The method of claim 17, further comprising:

illuminating, by at least one light source, the end-face of the electrical cable with diffuse illumination; and reducing, by an ambient light blocker, ambient illumination of the end-face of the electrical cable.

20. The method of claim 17, further comprising presenting, via a display of a user interface, information indicative of the at least one layer dimension.

* * * * *